United States Patent
Kalache et al.

(10) Patent No.: US 11,895,356 B1
(45) Date of Patent: Feb. 6, 2024

(54) SYSTEMS AND METHODS FOR GROUP CAPTURE OF INTERACTIVE SOFTWARE

(71) Applicant: Microsoft Technology Licensing, LLC, Redmond, WA (US)

(72) Inventors: Hamze Mohamad Kalache, Bellevue, WA (US); Mehmet Akkurt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/094,802

(22) Filed: Jan. 9, 2023

Related U.S. Application Data

(60) Provisional application No. 63/426,982, filed on Nov. 21, 2022.

(51) Int. Cl.
*H04N 21/433* (2011.01)
*H04N 21/8355* (2011.01)

(52) U.S. Cl.
CPC ..... *H04N 21/4334* (2013.01); *H04N 21/8355* (2013.01)

(58) Field of Classification Search
CPC .............. H04N 21/4334; H04N 21/8355
USPC ........................................... 386/248
See application file for complete search history.

(56) References Cited

U.S. PATENT DOCUMENTS

| | | | | |
|---|---|---|---|---|
| 9,106,972 | B2 * | 8/2015 | Nandiraju | H04N 21/4668 |
| 11,722,580 | B2 * | 8/2023 | Sahoo | H04L 67/563 |
| | | | | 709/238 |
| 2010/0272414 | A1 * | 10/2010 | Reneris | H04N 21/47 |
| | | | | 386/248 |
| 2018/0013975 | A1 * | 1/2018 | Tang | H04N 21/4622 |
| 2020/0324208 | A1 * | 10/2020 | Cleven | A63F 13/35 |
| 2022/0395756 | A1 * | 12/2022 | Benedetto | A63F 13/87 |
| 2023/0224146 | A1 * | 7/2023 | Stayskal | H04L 9/3066 |
| | | | | 380/28 |
| 2023/0252028 | A1 * | 8/2023 | Park | G06F 8/35 |
| | | | | 707/769 |
| 2023/0254412 | A1 * | 8/2023 | Jorasch | H04L 65/1089 |
| | | | | 709/204 |
| 2023/0267478 | A1 * | 8/2023 | Kanchana Sivakumar | |
| | | | | G06Q 30/0201 |
| | | | | 705/7.29 |

\* cited by examiner

*Primary Examiner* — Helen Shibru
(74) *Attorney, Agent, or Firm* — RAY QUINNEY & NEBEKER P.C.; John O. Carpenter

(57) ABSTRACT

A method of capturing video and audio information includes, at a server computer, determining a capture group that includes at least a first client device and a second client device. The method further includes receiving a group capture request and transmitting an individual capture request to at least the second client device. The method further includes receiving a first individual capture from the first client device and a second individual capture from the second client device, associating the first individual capture with the second individual capture in a group capture, and providing access to the group capture to at least one of the first client device and the second client device.

20 Claims, 11 Drawing Sheets

SYSTEMS AND METHODS FOR GROUP CAPTURE OF INTERACTIVE SOFTWARE

CROSS REFERENCE TO RELATED APPLICATIONS

The present application claims priority to and the benefit of U.S. Provisional Patent Application No. 63/426,982, entitled "SYSTEMS AND METHODS FOR GROUP CAPTURE OF INTERACTIVE SOFTWARE" filed Nov. 21, 2022, which is incorporated herein by reference in its entirety.

BACKGROUND

Background and Relevant Art

Interactive software such as electronic games can be captured or otherwise recorded for later viewing. The recorded and/or edited videos may be viewed for entertainment, education, training, coaching, or commentary. Some videos are edited for entertainment purposes and/or distributed on various websites or other avenues. Emergent gameplay experiences can be shared to create and strengthen social experiences.

BRIEF SUMMARY

In some embodiments, a method of capturing video and audio information includes, at a server computer, determining a capture group that includes at least a first client device and a second client device. The method further includes receiving a group capture request and transmitting an individual capture request to at least the second client device. The method further includes receiving a first individual capture from the first client device and a second individual capture from the second client device, associating the first individual capture with the second individual capture in a group capture, and providing access to the group capture to at least one of the first client device and the second client device.

In some embodiments, a system for capturing video and audio information includes a server in data communication with a network. The server includes a processor and a hardware storage device, where the hardware storage device has instructions stored thereon that, when executed by the processor, cause the server to determine a capture group that includes at least a first client device and a second client device. The instructions further cause the server to receive a group capture request and transmit an individual capture request to at least the second client device. The instructions further cause the server to receive a first individual capture from the first client device and a second individual capture from the second client device, associate the first individual capture with the second individual capture in a group capture, and provide access to the group capture to at least one of the first client device and the second client device.

In some embodiments, a system for capturing video and audio information includes a first client device, a second client device, and a server in data communication with the first client device running an interactive software application and the second client device running the interactive software application via a network. The server includes a processor and a hardware storage device, where the hardware storage device has instructions stored thereon that, when executed by the processor, cause the server to determine a capture group that includes at least the first client device and the second client device. The instructions further cause the server to receive a group capture request and transmit an individual capture request to at least the second client device. The instructions further cause the server to receive a first individual capture from the first client device and a second individual capture from the second client device, associate the first individual capture with the second individual capture in a group capture, and provide access to the group capture to at least one of the first client device and the second client device.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 through 2-3 are a schematic representation of requests transmitted through a system, according to at least some embodiments of the present disclosure;

FIG. 3 is a flowchart illustrating a method of initiating a group capture, according to at least some embodiments of the present disclosure;

FIG. 4-1 through 4-4 illustrate embodiments of capture groups, according to at least some embodiments of the present disclosure;

FIG. 7-1 illustrates tracks of a group capture, according to at least some embodiments of the present disclosure;

FIG. 7-2 illustrates tracks of a group capture with a merged chat audio track, according to at least some embodiments of the present disclosure;

DETAILED DESCRIPTION

The present disclosure relates generally to systems and methods for improving social sharing of video information produced by a game application or other interactive software application. Systems and methods described herein provide remote activation of video and/or audio capture on client devices. In some examples, a plurality of users may interact, cooperate, or compete in an interactive software application, and a coordinated capture of video information can allow the users to view or edit the video information of an event in the interactive software application from multiple perspectives. In some embodiments, the group capture includes group chat audio to provide social context to the events of the interactive software application. In some embodiments, the group capture includes video information platform- or network-specific groups, such as previously confirmed friends within an online social network, to opt into the group capture. In some embodiments, the group capture includes video information from application-specific groups, such as cooperative teams or parties within a game application. In other examples, the group capture includes video information from competitive users, such as opponents in a game application. In some embodiments, the group capture includes dynamically defined groups based on conditions of the interactive software application, such as other players (with or without prior party or friend confirmation) in proximity within a game environment or engaged in the same task in the game environment. In some embodiments, a machine learning (ML) system evaluates the video information of the user's gameplay with the machine vision system in addition to evaluating associated audio information, game state data, user inputs, or combinations thereof of the user's gameplay to detect events and/or objects in user's gameplay. The detected objects and events are then identified and/or classified dynamically to create groups for group capture.

Figure 1:
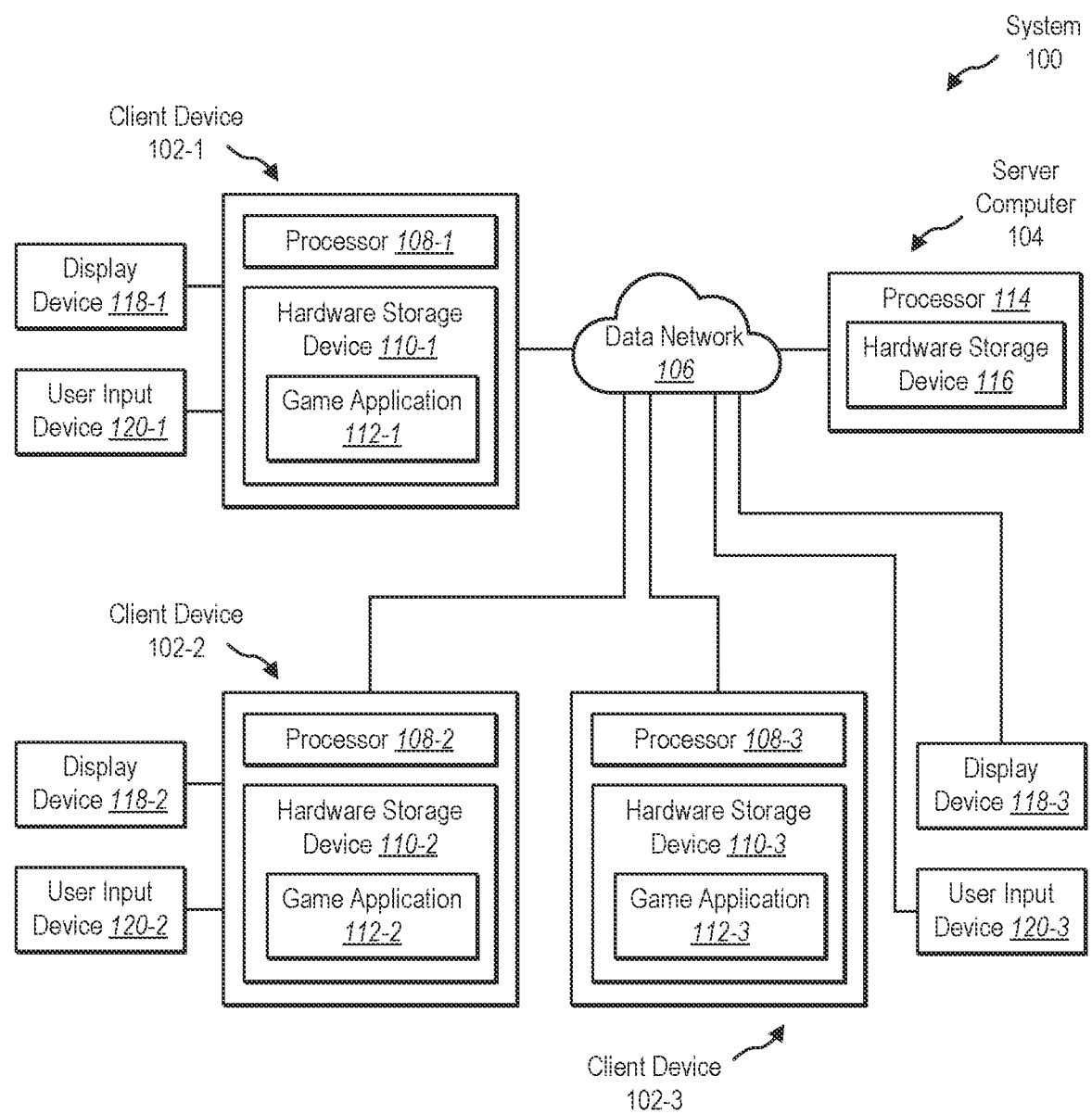
FIG. 1 is a schematic representation of a system for capturing video information from an interactive software application, according to at least some embodiments of the present disclosure.

In some embodiments, a system for group capture of video information from an interactive software application includes a plurality of client devices and at least one server computer in communication via a data network. Referring to FIG. 1, the system 100 includes a plurality of client devices 102-1, 102-2, 102-3 each running an interactive software application. The client devices 102-1, 102-2, 102-3 are in data communication with a server computer 104 via a data network 106. In some embodiments, each client device 102-1, 102-2, 102-3 is a computing device with a processor 108-1, 108-2, 108-3 and hardware storage device 110-1, 110-2, 110-3 in communication with the processor 108-1, 108-2, 108-3. In some embodiments, the hardware storage device 110-1, 110-2, 110-3 is any non-transient computer readable medium that may store instructions thereon. The hardware storage device 110-1, 110-2, 110-3 may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device 110-1, 110-2, 110-3 is local to and/or integrated with the client device 102-1, 102-2, 102-3. In some embodiments, the hardware storage device 110-1, 110-2, 110-3 is accessed by the client device 102-1, 102-2, 102-3 through a network connection.

The processor 108-1, 108-2, 108-3 may execute an interactive software application, such as a game application 112-1, 112-2, 112-3, that is stored on the hardware storage device 110 to render video information at least partially in response to user inputs to the client device 102-1, 102-2, 102-3. In some embodiments, the client device 102-1, 102-2, 102-3 includes a display device 118-1, 118-2, 118-3 to display the video information to a playing user. For example, the client device 102-1, 102-2, 102-3 may be a dedicated gaming console with an integrated display (e.g., NINTENDO SWITCH) or a general-purpose computer with an integrated display (e.g., a laptop computer). In some embodiments, the client device 102-1, 102-2, 102-3 is in communication with a display device 118-1, 118-2, 118-3 to display video information to a playing user. For example, the client device 102-1, 102-2, 102-3 may be a gaming console (e.g., MICROSOFT XBOX) that outputs the video information to a connected display device 118-1, 118-2, 118-3 (e.g., a television) for display to a playing user.

In some embodiments, the client device 102-1, 102-2, 102-3 includes a user input device 120-1, 120-2, 120-3 to receive user inputs from a playing user. For example, the client device 102-1, 102-2, 102-3 may be a dedicated gaming console with an integrated user input device (e.g., NINTENDO SWITCH) or a general-purpose computer with an integrated user input device (e.g., a laptop computer). In some embodiments, the client device 102-1, 102-2, 102-3 is in communication with a user input device 120-1, 120-2, 120-3 to receive user inputs from a playing user. For example, the client device 102-1, 102-2, 102-3 may be a gaming console (e.g., MICROSOFT XBOX) that receives user inputs via wired or wireless communications from a user input device 120-1, 120-2, 120-3 (e.g., a controller) of a playing user. In some embodiments, the user input device 120-1, 120-2, 120-3 is a headset configured to receive and transmit chat audio between users of the client devices 102-1, 102-2, 102-3 and/or other users via the data network 106.

In some embodiments, the client device 102-3 is located remotely from the display device 118-3 and/or the user input device 120-3. For example, the client device 102-3 may be a game server or part of a server blade that executes a game application 112-3 or other interactive software application and streams at least the video information to the connected display device 118-3 while receiving user inputs from a connected user input device 120-3. It should be understood that the user of the client device may, therefore, be remote from the client device.

In some embodiments, the video information or a portion of the video information is also transmitted to a server computer 104 via a data network 106. In some embodiments, the server computer 104 is located remotely from the client device 102 and the data network 106 is or includes the World Wide Web. For example, the client device 102 may be connected to the data network 106 via the playing user's home internet connection, and the server computer 104 may be located in a datacenter. In some embodiments, the server computer 104 is located locally to the client device 102 and the video information is transmitted over a local area network or a direct data connection. For example, a competitive electronic game tournament (e.g., an eSports competition) may have a local data network 106 to which all client devices 102 used for the competition are connected. A server computer 104 connected to the local data network 106 may communicate with the client devices 102 used for the competition.

In some embodiments, a first user of the first client device 102-1 may interact with a second user of the second client device 102-2 and/or a third user of the third client device 102-3 when each of the client devices is executing the same game application 112-1, 112-2, 112-3. For example, when each of the client devices is executing the same game application 112-1, 112-2, 112-3, the first client device 102-1, the second client device 102-2, and third client device 102-3 may be in data communication for online gameplay, such as multiplayer gameplay.

In some embodiments, the first user of the first client device 102-1 may interact with the second user of the second client device 102-2 and/or the third user of the third client device 102-3 when each of the client devices is in communication with the same software platform or social network via the server 104. For example, the first game application 112-1 and second game application 112-2 may be different electronic games (and the first user and second user may not be interacting in a game environment), but the first user of the first client device 102-1 and the second user of the second client device 102-2 may interact or engage outside of the game applications, such as in a group chat function facilitated by the server 104 that is independent of a game.

Figures 1, 2:
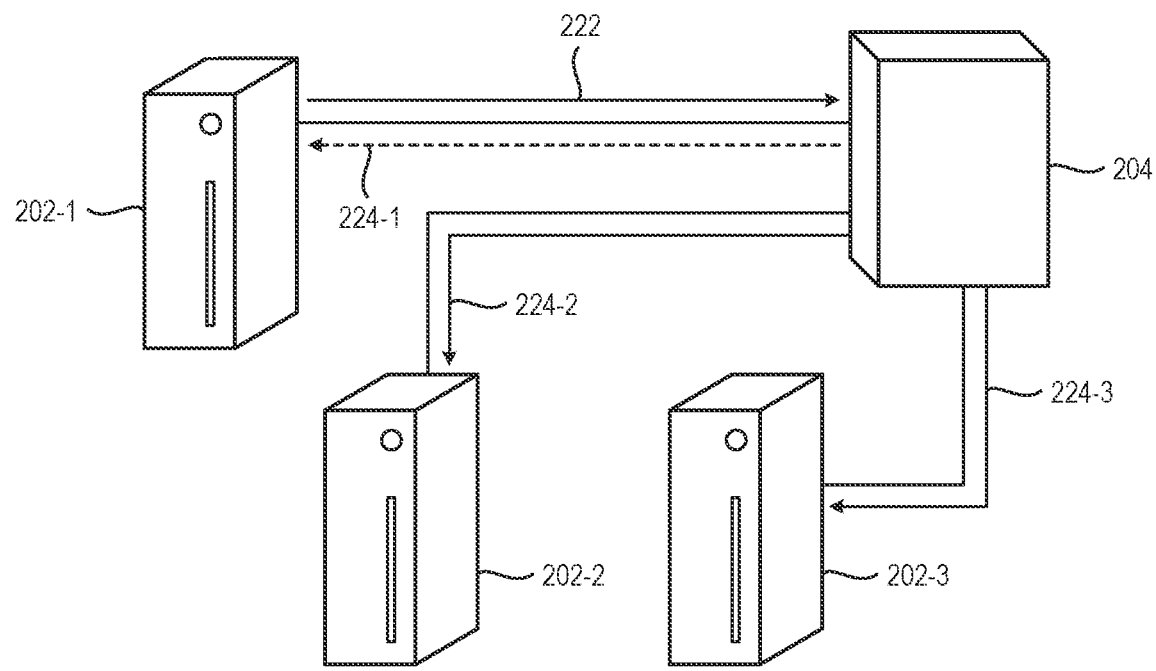
Figure 2:
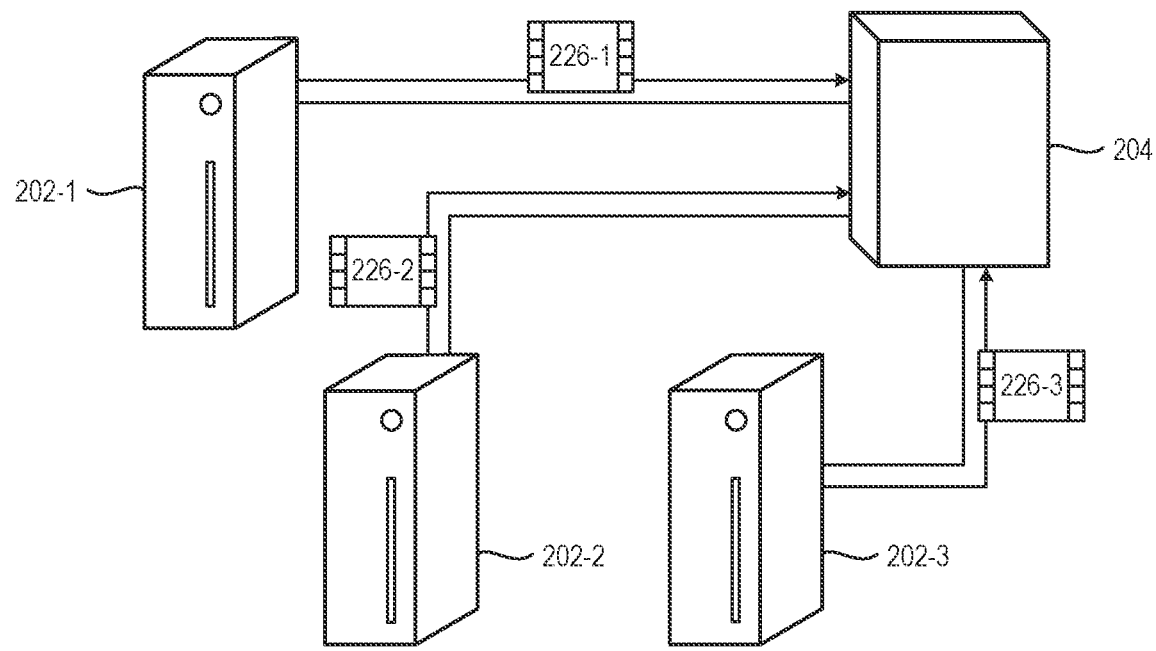
Figures 2, 3:
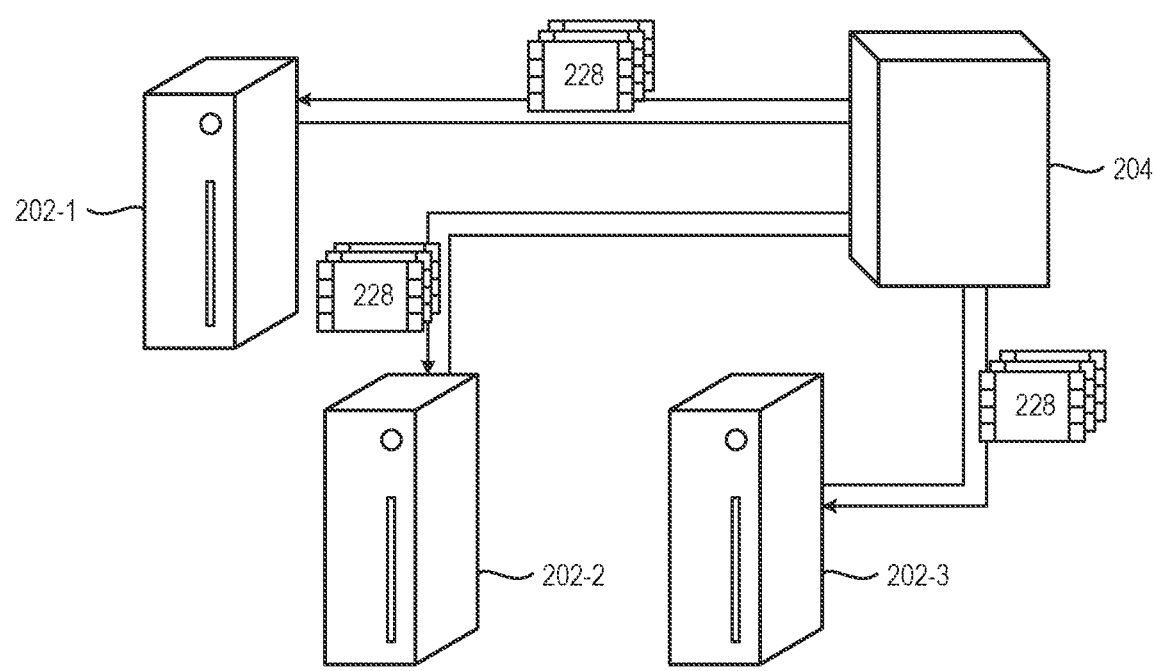
Figure 3:
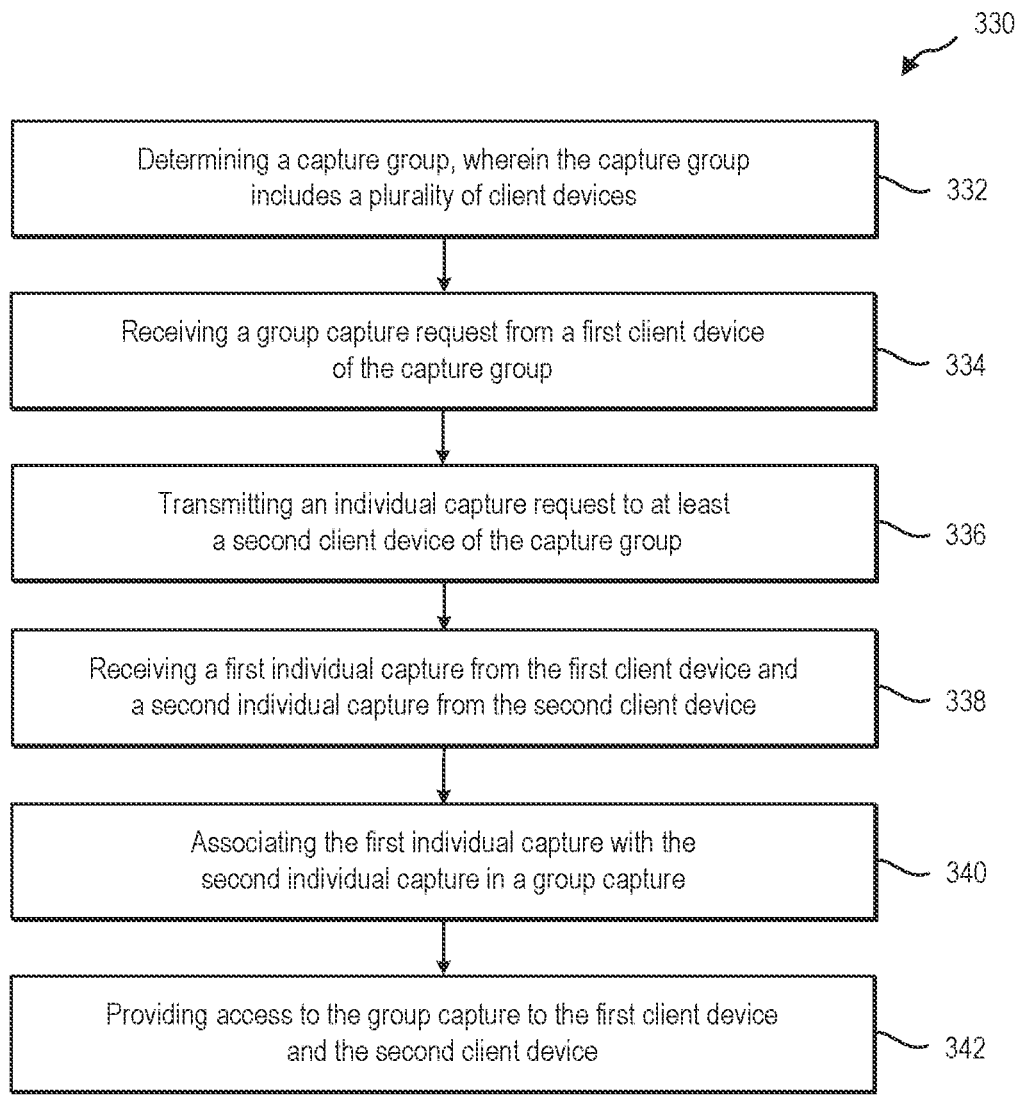

In a conventional system, a user can initiate a video and/or audio capture of the video information and/or audio information provided by the client device used by the user. However, when users are playing cooperatively or competitively, capturing only the first user's perspective on an event in a game environment can omit rememberable or entertaining in-game or social events. In some embodiments, systems and methods according to the present disclosure allow a first user to initiate a group capture of video and/or audio information from each client device in a group. For example, a first user may request, via the first user input device 120-1, a group capture through the first client device 102-1. The group capture request is transmitted to each client device in the group (e.g., the second client device 102-2 and the third client device 102-3) to initiate a video and/or audio capture at each client device. The individual captures at each client device are then uploaded to the server 104, where the individual captures are associated in a group capture. The server then provides access to the group capture for each user (e.g., user account) contributing to the group capture. In some embodiments, the individual captures include video information from the interactive software application, audio information from the interactive software application, chat audio from the group chat, or combinations thereof, FIG. 2-1 through 2-3 schematically illustrates an embodiment of a process of initiating and disseminating a group capture. FIG. 2-1 illustrates a first client device 202-1 with a first user account, a second client device 202-2 with a second user account, a third client device 202-3 with a third user account, and a server 204 in data communication with one another. In some embodiments, the server 204 is a single server that receives and transmits the group capture requests, as well as receives and/or transmits the video and/or audio information of the captures. In some embodiments, a first server (e.g., a social network server) receives and transmits the group capture requests, and a second server (e.g., a multimedia server) receives and/or transmits the video and/or or audio information of the captures.

In some embodiments, the first client device 202-1 sends a group capture request 222 to the server 204. The server 204 then sends individual capture requests to each of the client devices in the group. For example, the server 204 transmits a second individual capture request 224-2 to the second client device 202-2 and a third individual capture request 224-3 to the third client device 202-3. In some embodiments, the first client device 202-1 initiates an individual capture at or near the time the first client device 202-1 transmits the group capture request 222 without receiving a first individual capture request 224-1 from the server 204. In some embodiments, the server 204 sends a first individual capture request 224-1 to the first client device 202-1.

In FIG. 2-2, in response to receiving the individual capture requests 224-1, 224-2, 224-3 described in relation to FIG. 2-1, the client devices 202-1, 202-2, 202-3 each capture video and/or audio information in an individual capture 226-1, 226-2, 226-3 and upload the individual captures 226-1, 226-2, 226-3 to the server 204. After receiving the individual captures 226-1, 226-2, 226-3, the server 204 associates the individual captures 226-1, 226-2, 226-3 with one another in a group capture 228 shown in FIG. 2-3 and provides access to the group capture 228 to each of the client devices 202-1, 202-2, 202-3 and/or to the user accounts (e.g., the first user account, second user account, third user account) active on the client devices during the group capture 228. For example, the server 204 may provide access to user account, and the user account, irrespective of a device used to access the server, has access to the group capture 228. In a specific example, the first individual capture 226-1 may be provided from the first client device 202-1 and a first user account logged into the first client device 202-1 at the time of capture may access the group capture from a different device, such as a smartphone or laptop computer. In some embodiments, the group capture 228 is stored on the server 204 and is accessible by the client devices and/or user accounts. In some embodiments, the group capture 228 is downloadable from the server 204 by the client devices and/or user accounts. In some embodiments, the group capture 228 is pushed to the hardware storage device of the client devices.

FIG. 3 is a flowchart illustrating an embodiment of a method 330 of initiating a group capture of an interactive software application. The method 330 includes, at a server, determining a capture group at 332 wherein the capture group includes a plurality of client devices. In some embodiments, each of the client devices has a user account active on the client device, where a user account provides identification of a user on an online platform, such as an electronic game social network used for multiplayer game modes and matchmaking. For example, the first client device has a first user account logged in and active, and a second client device has a second user account logged in and active.

The capture group may be determined through one or more criteria. For example, the first user account (User 1)

and second user account (User 2) may be confirmed platform friends on the online platform. In some embodiments, the capture group includes any confirmed platform friends that are online and active, irrespective of the software application being used by the user accounts. For example, User 1 and User 2 are confirmed platform friends and both online on the platform, while User 1 is playing a first game application and a User 2 is playing a second game application. In such an example, the capture group may include User 1 and User 2.

In some embodiments, the capture group includes select confirmed platform friends that are online and active, irrespective of the software application being used by the user accounts. For example, User 1, User 2, and User 3 are confirmed platform friends and all online on the platform, while User 1 is playing a first game application, User 2 is playing a second game application, and User 3 is playing a third game application. In such an example, the capture group may include a subset of the confirmed friends, such as User 1 and User 2, where the subset is preselected by one or more of the users.

In some embodiments, the capture group includes users of the platform that are online in a predefined party or group on the platform, irrespective of the software application being used by the user accounts. For example, User 1 invites User 2 and User 3 to join a party. User 2 and User 3 accept the invitation and join the party, while User 1 is playing a first game application, User 2 is playing a second game application, and User 3 is playing a third game application. In such an example, the capture group the party members: User 1, User 2, and User 3.

In some embodiments, the capture group includes any confirmed platform friends that are online and active, and the user accounts are using the same software application. For example, User 1, User 2, and User 3 are all confirmed platform friends, but only User 1 and User 2 are playing the same game application while User 3 is playing a different game application. In such an example, the capture group includes User 1 and User 2 and not User 3.

In some embodiments, the capture group includes any confirmed platform friends that are online and active, and the user accounts are using the same software application together in the same instance of the software. For example, User 1, User 2, User 3, and User 4 are all confirmed platform friends, but only User 1, User 2, and User 4 are playing the same game application while User 3 is playing a different game application. User 1 and User 2 are playing together in shared instance round of competitive multiplayer mode (e.g., in the same round of online play together), while User 4 is playing in a solo campaign mode. In such an example, the capture group includes User 1 and User 2 and not User 3 (different game) or User 4 (different instance).

In some embodiments, the capture group includes any user accounts that are engaged with one another in an in-application party, irrespective of confirmed platform friend status between the user accounts. For example, a game application may assign user accounts to a party of four users together for a task, mission, or team during online play in the game application. In such an example, the user accounts may or may not be confirmed platform friends, and the capture group may include the four members of the in-application party for the duration of the time the users are members of the in-application party.

In some embodiments, the capture group includes any user accounts that are engaged with a shared in-game event or task, irrespective of confirmed platform friend status or in-application party status between the user accounts. For example, an interactive software application may allow users to interact with one another and a shared open world within an instance of the virtual environment. The shared open world may allow the first user and second user to engage cooperatively or competitively in a world event in the shared open world. For example, a world event may be triggered by a user or may be initiated based on a timer or schedule that allows any players in the local region of the game environment to join in the world event. A particular example of a world event is a dragon appearing in a particular region of a massively-multiplayer online role-playing game (MMORPG), and any avatars located in the region can engage with and fight the dragon. In such an example, the user accounts controlling the avatars may or may not be confirmed platform friends, and the capture group may include any user accounts controlling any avatar engaged with the world event for the duration of the time the users are engaged with the world event.

In some embodiments, the capture group includes any user accounts that are present within an in-application region or radius around an avatar controlled by the first user account in the in-application virtual environment, irrespective of confirmed platform friend status or in-application party status between the user accounts. For example, an interactive software application may allow users to interact with one another and a shared open world within an instance of the virtual environment. The shared open world may allow the first user and second user to engage cooperatively or competitively in the shared open world. As described herein, world events or other events or locations in the in-application virtual environment may draw user avatars into proximity with one another. Capturing game video, game audio, and chat audio from any user accounts with an avatar in proximity to the avatar of the first user account may allow a group capture that includes multiple perspectives and commentary on an event or location in the interactive software application. In such an example, the user accounts controlling the avatars in the region or in a radius around the user avatar may or may not be confirmed platform friends, and the capture group may include any user accounts controlling any avatar within the region or within a radius around the user avatar.

In some embodiments, the presence of user accounts in a capture group persists for any user accounts within the capture group at any time during the requested capture duration. For example, presence of user accounts in a capture group persists for any user accounts engaged in a world even (or an in-application party or other temporary affiliations) for a pre-determined period of time (e.g., 10 seconds, 30 seconds, 60 seconds, etc.) such that a user can initiate a group capture for such period of time after the termination and still have the system determine the user accounts to be part of the capture group for the purpose of capturing the world event (or other shared experience of the capture group).

After or during determination of the capture group, the method may include checking capture permissions of any user accounts determined to be part of the capture group. For example, a system setting of a user account may include an opt-in requirement for group captures on the platform and/or the interactive software application. In such examples, a user account that is determined to part of the capture group is added to the capture group only if the user account has opted in. In some examples, a system setting of a user account may include an opt-out option for group captures on the platform and/or the interactive software application. In such examples, a user account that is otherwise determined to part of the capture group is removed from or not added to the capture group when the user account has opted out.

In some embodiments, the method 330 includes receiving, at a server, a group capture request at 334. The group capture request is provided by the first client device of the capture group. In some embodiments, the group capture request is transmitted to the server from the first client device based at least partially on a user input to the first client device. For example, the first user may initiate a group capture request from a controller or other user input device. In some embodiments, the group capture request is transmitted by the first client device based at least partially on a software request, command, trigger, or prompt from the interactive software application. For example, an event or achievement or setting in the interactive software application may instruct the first client device to transmit a group capture request to the server.

The method 330 further includes transmitting an individual capture request to at least a second client device of the plurality of client devices at 336. In some embodiments, transmitting an individual capture request to at least a second client device of the plurality of client devices includes also transmitting an individual capture request to the first client device. For example, in response to the group capture request, the server transmits individual capture requests to all members of the capture group (and according to permissions). In some embodiments, transmitting an individual capture request to at least a second client device of the plurality of client devices includes transmitting an individual capture request to all client devices in the capture group (and according to permissions) other than the first client device. In such examples, the first client device initiates an individual capture at the first client device at substantially the same time as transmitting the group capture request to the server, meaning the first client device initiates the individual capture without receiving an individual capture request from the server. In at least one example, the server transmits an individual capture request to the first client device, and the first client device ignores the individual capture request in the event the first client device has already initiated an individual capture associated with the group capture request.

After transmitting an individual capture request at 336, the method 330 further includes receiving a first individual capture from the first client device and a second individual capture from a second client device at 338. In some embodiments, the method 330 further includes receiving individual captures from each of the client devices in the capture group (and according to permissions).

In some embodiments, at least one of the individual captures includes video information, software audio (e.g., game audio of a game application), and chat audio from a microphone in data communication with the client device. In some embodiments, the first individual capture includes video information, software audio (e.g., game audio of a game application), and chat audio from a microphone in data communication with the first client device and the second individual capture includes video information, software audio (e.g., game audio of a game application), and chat audio from a microphone in data communication with the second client device. In some embodiments, each individual capture of each client device includes video information, software audio (e.g., game audio of a game application), and chat audio from a microphone in data communication with the respective client device. In some embodiments, the server receives and transmits chat audio from each of the members of a platform-level party or in-game party. For example, the individual captures may include the video information and software audio from the respective client devices, and chat audio for the group capture is captured at the server.

In some embodiments, at least one individual capture includes game state data. Game state data includes any information that may allow an electronic device to recreate at least part of a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

In some embodiments, at least one individual capture includes user inputs, such as directional inputs, analog trigger or button inputs, or other user inputs from a user input device. A user input, according to the present disclosure, should be understood to include any signal or input by any input mechanism that provides instructions to the client device to interact with and/or affect the game application. The user input information may provide additional context to the events in the individual capture.

The method 330 further includes associating the first individual capture with the second individual capture in a group capture at 340. In some embodiments, associating the first individual capture and the second individual capture includes merging the individual captures (and any other individual captures received in response to the group capture request) into a single file (i.e., "a group capture file")

In some embodiments, associating the first individual capture and the second individual capture includes appending or altering metadata of the individual captures to identify the individual captures as part of the group capture. In such an example, a query, for example from editing software or from a client device, for the group capture will return all individual capture files with a header or other metadata that includes the group capture identifier (ID).

In some embodiments, associating the first individual capture and the second individual capture includes creating a group capture ID file that includes unique file identifications for each of the individual captures. For example, the group capture ID file may not include the individual captures, but rather identifies the individual captures in the group capture for access or retrieval.

As described herein, in some embodiments, the chat audio for each user account in the capture group is captured at the respective client devices as part of or simultaneously with the individual capture. In some embodiments, the server receives and transmits chat audio from each of the members of a platform-level party or in-game party. For example, the individual captures may include the video information and software audio from the respective client devices, and chat audio for the group capture is captured at the server.

The method 330 further includes providing access to the group capture to at least the first client device and the second client device at 342. In some embodiments, the server provides access to the client devices while the respective user accounts are logged in and active on the client devices. In other words, the server provides access to the group capture to the user accounts of the capture group. In some examples, the user accounts may subsequently access the group capture from other electronic devices, other than the client devices used for the individual captures.

In some embodiments, providing access to the group capture includes making the group capture (either a single group capture file or a plurality of associated files) available for download by the user accounts. For example, a first user account logged in via the first client device may download the group capture to the first client device. In another example, a second user account of the capture group may access and download the group capture to a personal computer for editing. In some embodiments, providing access to the group capture includes pushing the group capture to the client devices (e.g., to the hardware storage devices) of the capture group for viewing or editing. Pushing the group capture to the client devices can allow the group capture to be deleted from the server hardware storage device and limit a storage burden on the server side. In some embodiments, retaining the group capture on the server hardware storage device allows the individual captures to be deleted from the client devices, which prevents group capture requests from a first client device filling the hardware storage device of a second client device unintentionally. For example, the server may transmit a delete request to the client devices to instruct the client device to delete the individual capture stored thereon. In some embodiments, the delete request is sent after providing access to the group capture. Additionally, a client device with a hardware storage device at or near capacity may be unable to capture the individual capture for upload to the group capture. In some examples, by deleting the individual capture from the hardware storage device on the client device each time, the client device can retain enough free space in the hardware storage device to continue capturing individual captures for group captures.

Figures 1, 4:
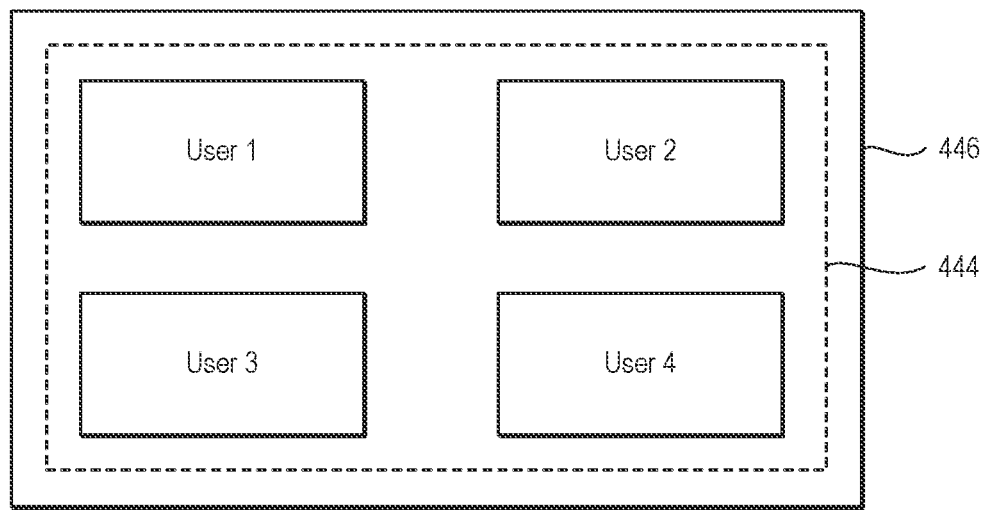
Figures 2, 4:
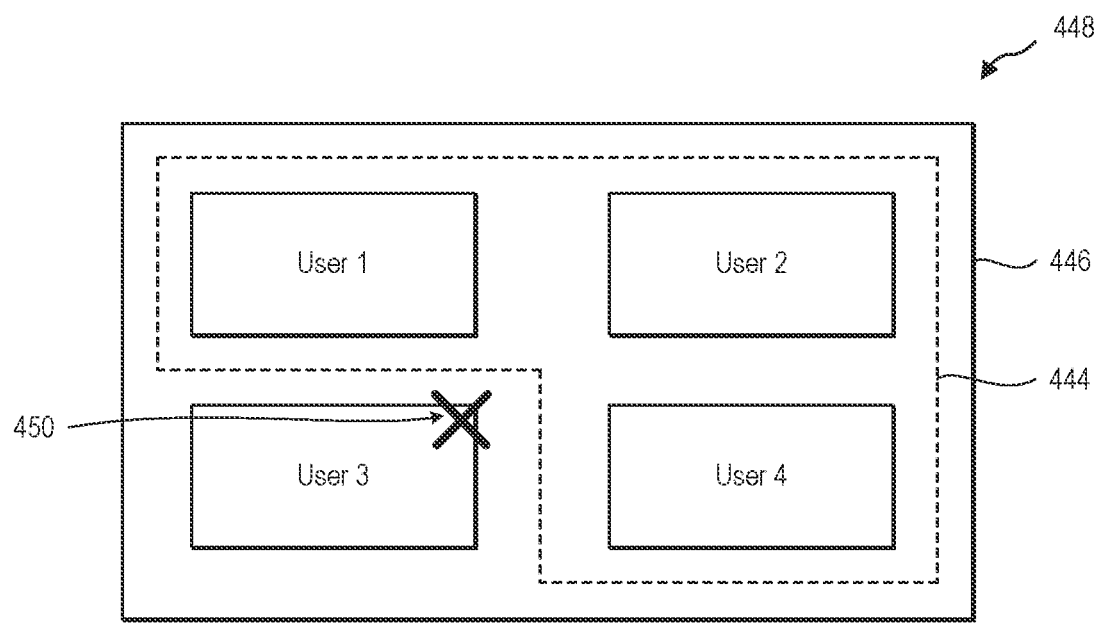
Figures 3, 4:
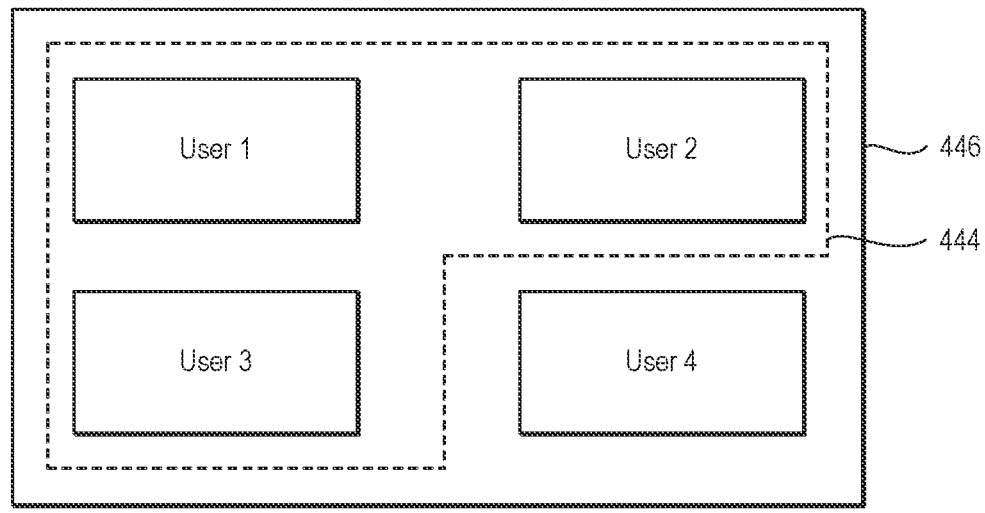
Figure 4:
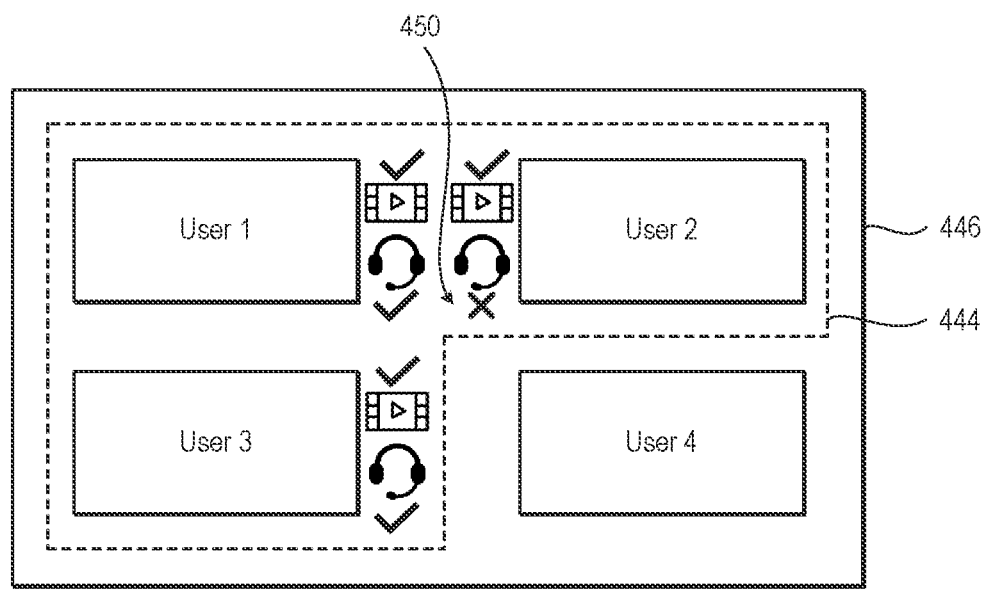

FIG. 4-1 through 4-4 schematically illustrate example capture groups within a set of four users. For example, FIG. 4-1 illustrates a capture group 444 defined based on four users in an in-game party 446, such as on a cooperative team in a multiplayer (player vs. environment (PvE) or player vs. player (PvP)) game mode. User 1, User 2, User 3, and User 4 are each a member of the in-game party 446 and, therefore, members of the capture group 444 in the event a group capture request is received at the server.

In some embodiments, permissions or other statuses of the user can alter the capture group from the default determination. FIG. 4-2 illustrates the same four users in an in-game party 446 in which User 2 has, in user account or system settings, opted out 450 of group captures. The capture group 444 is thereby altered or limited to include User 1, User 3, and User 4 of the in-game party 446 that have affirmatively opted-in 448 or not opted-out. FIG. 4-3 illustrates the same four users in an in-game party 446 in which User 1, User 2, and User 3 are confirmed platform friends on the online platform through which the in-game party 446 is managed. In such an example, the capture group 444 includes the confirmed platform friends that are also members of the in-game party 446. In some embodiments, the permission settings allow users to opt-in or opt-out of portions of the group capture. For example, FIG. 4-4 illustrates the capture group 444 of FIG. 4-3 in which the third user has, in user account or system settings, opted out 450 of chat audio in group captures. Therefore, the capture group 444 remains the confirmed platform friends that are also members of the in-game party 446, however, the chat audio for User 3 is not captured and/or not associated with the group capture. In at least one embodiment, other users can opt-out of capturing certain users' or portions of users' video and audio. For example, User 1 may not want to capture the chat audio (due to quality, content, or noise) of User 2, and may choose to exclude User 2's chat audio from the group capture.

Figure 5:
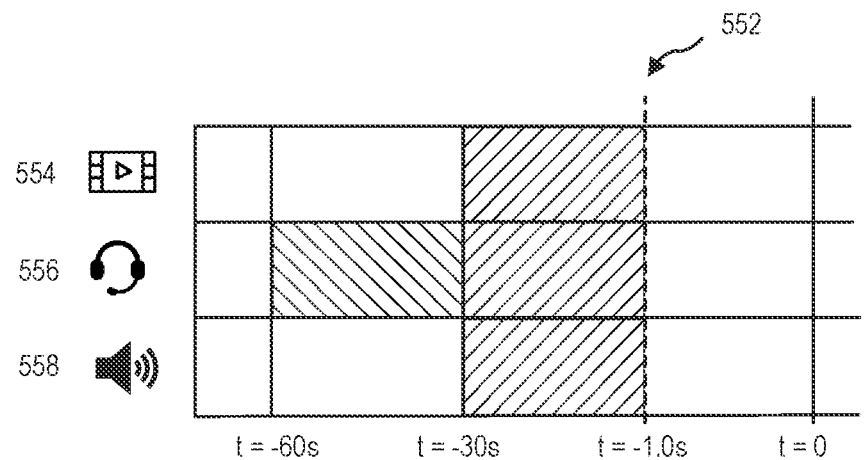
FIG. 5 is a timeline illustrating capture buffers according to a capture request, according to at least some embodiments of the present disclosure.

A group capture can allow more immersive video and audio clips while also providing simpler editing of content with multiple perspectives. Because the group capture may include chat audio, the different video tracks and audio tracks (including chat audio) may benefit from synchronization at the server level. In some embodiments, the server can transmit individual capture requests in response to a group capture request that includes a timestamp. FIG. 5 illustrates a timeline of synchronizing a group capture using a timestamped request.

FIG. 5 illustrates an individual capture request received at t=0 when the individual capture request is based on a group capture request received earlier. In some embodiments, the group capture request is timestamped at the earlier time. The individual capture request instructs the client device to capture a period of time prior to the timestamp at a capture start time 552. The client device may capture a 30-second individual capture, a 60-second individual capture, or other period of time prior to the capture start time 552. In some embodiments, the capture buffer is different between channels or tracks of the individual capture. For example, a video track 554 may have a different buffer length (30 seconds in the illustrated example of FIG. 5) from the chat audio track 556 (60 seconds in the illustrated example of FIG. 5) and the software audio track 558 (30 seconds in the illustrated example of FIG. 5). In some embodiments, the capture buffer for each track may be different for different users or client devices of the capture group. By synchronizing the capture from the timestamp 552 of the group capture request, any variations in the transmission or processing of the individual capture requests can be limited or removed.

Figure 6:
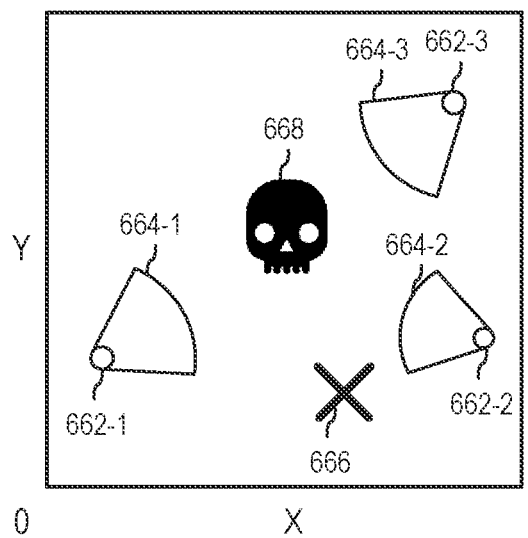
FIG. 6 is a representation of a virtual environment recreated from game state data, according to at least some embodiments of the present disclosure.

FIG. 6 is an example game environment map of game state data in the group capture. As described herein, game state data includes any information that may allow an electronic device to recreate at least part of a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

In some embodiments, the game state data is captured as part of each individual capture. For example, the game state data of the avatar controlled by the user account associated with the client device may be captured as part of the individual capture of the client device. Each individual capture, therefore, includes part of the game state data for the virtual environment or game instance in which the capture group has avatars. In some embodiments, the server may compile the game state data from individual captures into game state data for the group capture.

In some embodiments, the game state data is obtained from a multiplayer server and compiled with individual captures to provide game state data for the group capture. For example, the multiplayer server may coordinate the state of the virtual environment for a plurality of client devices in a game instance. The multiplayer server may, therefore, have game state data that identifies each of the avatars associated with the user accounts of the capture group. In such examples, the multiplayer server has game state data for non-player characters (NPC) and other objects in the virtual environment.

Because the game state data provides location and orientation of avatars in the virtual environment, the game state data can allow awareness of the point of view (POV) of each individual capture in the group capture. FIG. 6 is a schematic representation of avatars in a virtual environment 660. For example, the in-game party includes four users, of which three are confirmed platform friends and part of the capture group.

A first user avatar 662-1 has a first field of view (FOV) 664-1 within the virtual environment 660. The first individual capture from the first client device may reflect the POV of the first user avatar 662-1, which includes video information from the first FOV 664-1 and software audio of the environment and other audio prompts (which may include additional audio information beyond that which is visible in the first FOV 664-1) from the location and/or orientation of the first user avatar 662-1 in the virtual environment 660. A second user avatar 662-2 has a second FOV 664-2 within the virtual environment 660. The second individual capture from the second client device may reflect the POV of the second user avatar 662-2, which includes video information from the second FOV 664-2 and software audio of the environment and other audio prompts (which may include additional audio information beyond that which is visible in the second FOV 664-2) from the location and/or orientation of the second user avatar 662-2 in the virtual environment 660. The third individual capture from the third client device may reflect the POV of the third user avatar 662-3, which includes video information from the third FOV 664-3 and software audio of the environment and other audio prompts (which may include additional audio information beyond that which is visible in the third FOV 664-3) from the location and/or orientation of the third user avatar 662-3 in the virtual environment 660.

In some embodiments, the game state data of the group capture includes the location and/or orientation of other members of the in-game party for whom the group capture does not have video information and/or audio information. For example, a non-group avatar 666 is present in the virtual environment 660, and the location of the non-group avatar 666 is known in the game state data to provide context to the virtual environment and identification of the non-group avatar 666 in the case that non-group avatar 666 is visible in the FOV of one of the video tracks of the group capture. For example, the third user avatar 662-3 is visible within the second FOV 664-2, and the game state data can provide such information to a viewer of the group capture and/or the game state data for the group capture.

FIG. 6 further illustrates the presence of an NPC 668 in the virtual environment 660. By providing location (and other) information about the NPC 668 or other objects in the virtual environment, a viewer of the group capture and/or the game state data for the group capture can easily identify which FOV contains the NPC 668 to simplify editing. Further, a viewer of the group capture may use the game state data to visualize the available video and/or audio tracks in the context of the virtual environment 660. In some embodiments, a user interface (UI) may allow the viewer to select the user avatars in a visualization similar to that in FIG. 6 to change the video and/or audio track to that of the selected user avatar during viewing. For example, the game state data may indicate to a view that any of the first FOV 664-1, the second FOV 664-2, or the third FOV 664-3 include the NPC 668, while the second FOV 664-2 includes the NPC 668, the first user avatar 662-1, and the third user avatar 662-3. The viewer may change the video and/or audio track to the second FOV 664-2 of the second user avatar 662-2 to see more of the scene.

Figures 1, 7:
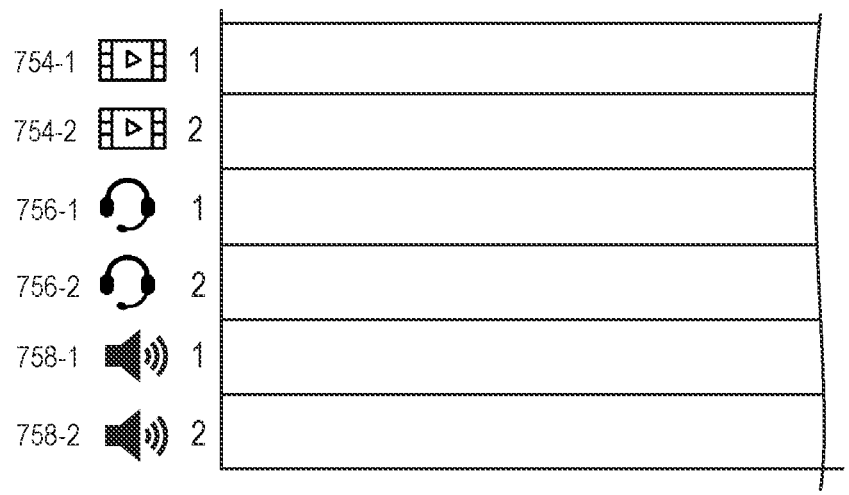
Figures 2, 7:
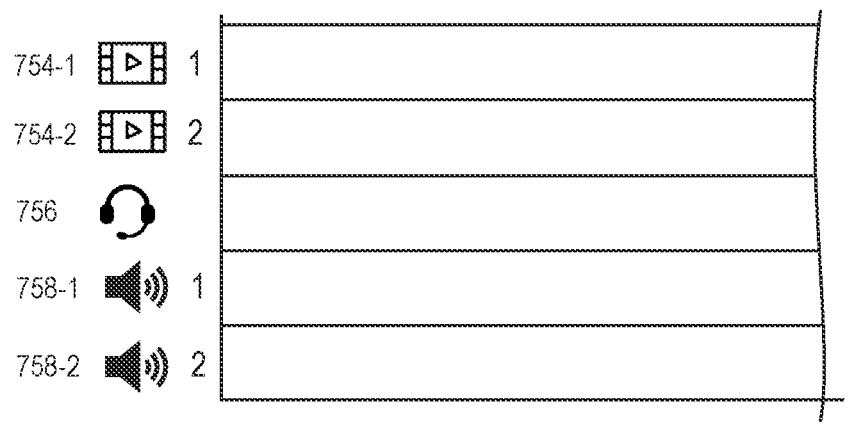

FIGS. 7-1 and 7-2 illustrate different tracks of the group capture. FIG. 7-1 illustrates a single file (or a plurality of files accessed by an editing software and edited concurrently in a single video project) with multiple video tracks, multiple software audio tracks, multiple chat audio tracks. In some embodiments, a group capture file includes a plurality of video tracks 754-1, 754-2, a plurality of chat audio tracks 756-1, 756-2, and a plurality of software audio tracks 758-1, 758-2. For example, the chat audio tracks 756-1, 756-2 may each be associated with a different user of the group capture in the chat audio between the members of the capture group. The first chat audio track 756-1, in some embodiments, captures only the chat microphone of the first user from the first client device. During editing or viewing, a viewer may select individual tracks from the group capture at any given time. For example, an editor may choose to display the first video track 754-1 and first software audio track 758-1 with the second chat audio 756-2, such that the view visualizes the virtual environment of the group capture from the POV of the first user while hearing the chat audio commentary of the second user.

FIG. 7-2 illustrates a single file (or a plurality of files accessed by an editing software and edited concurrently in a single video project) with multiple video tracks, multiple software audio tracks, merged chat audio tracks. In some embodiments, a group capture file includes a plurality of video tracks 754-1, 754-2, a single chat audio track 756, and a plurality of software audio tracks 758-1, 758-2. In some embodiments, the chat audio is merged from the plurality of chat audio tracks from the individual captures. In some embodiments, the chat audio is a single track that is obtained from the server, as described herein.

A group capture (either a single file or a plurality of associated files) as described herein can allow for more immersive, more social, and more cinematic captures of a virtual environment, such as a game environment. In some embodiments, the server or a client device can provide at least partially automated editing to create an edit of the group capture for later viewing, sharing, or downloading by one or more of the members of the capture group.

Figure 8:
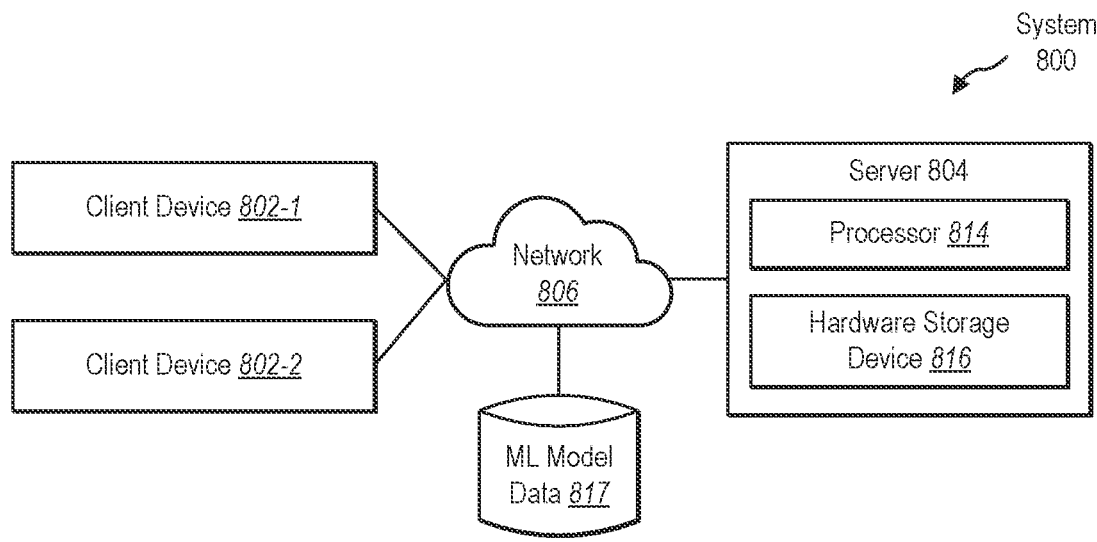
FIG. 8 is a diagram of a system for group captures, according to at least some embodiments of the present disclosure.

FIG. 8 illustrates an embodiment of a system 800 for automated initiation and/or editing of group captures. In some embodiments, the system 800 is configured to detect one or more events during usage or gameplay of an interactive software application, where a group of users on different client devices are interacting in the interactive software application. In some embodiments, the system 800 is configured to detect one or more events in real-time. In some embodiments, the system 800 is configured to detect one or more events in a group capture that is independently initiated. In some examples, the group capture is initiated by a user input from a client device. In some examples, the group capture is initiated by a software application of the client device. In some examples, the group capture is initiated by a server.

The server computer 804 includes a processor 814 and a hardware storage device 816 in data communication with the processor 814. The hardware storage device 816 has instructions stored thereon that, when executed by the processor 814, cause the server computer 804 to perform any of the methods described herein. For example, the server computer 804 may detect events in the video information to classify different events and/or objects based on identified textures, models, animations, or other criteria.

In at least one embodiment, the server computer 804 includes or is in communication with a machine learning (ML) model that detects and/or reports events in the video information to evaluate the video information and identify and tag events. In some embodiments, the server computer 804 has stored thereon (e.g., in the hardware storage device 816) a ML model that accesses and/or communicates with ML model data 817. In some examples, the ML model data is stored locally to the server computer. In some examples, the ML model data 817 is stored remotely from the server computer 804 and accessed by the server computer 804 via the data network 806. For example, the ML model data 817 may be aggregated from and/or refined by a plurality of ML models executed by a plurality of server computers. The ML model data may be updated based on the outputs of the ML models, with the most current ML model data made available for the ML model running on the server computer 804 when needed.

As illustrated in the foregoing discussion, the present disclosure utilizes a variety of terms to describe features and advantages of the ML model. Additional detail is now provided regarding the meaning of such terms. For example, as used herein, a "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model.

In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain events. The ML system may perform one or more machine vision techniques to evaluate the video information for associated events when the UI notification is present. The ML system may refine over iterations to "learn" when visual events are correlated with the UI notification. For example, a UI element indicating player avatar health may increase in value in response to the player avatar interacting with a health pack in the game environment.

In some embodiments, the ML system can create an application module of expected or correlated events in the video information. In a particular example, if the UI element indicates that the playing user has performed an opponent elimination, other aspects of the video information may be detected and/or identified to associate opponent eliminations with the identified animation. In another example, each time a player avatar performs an assist, the ML system may identify to whom the player avatar passed the ball for the goal (such as in sports games including Rocket League or FIFA). Further, the ML system can create or refine an application module to include commonly queried or associated categories of tags for events. In some examples, all key events may be associate with a match timestamp, while opponent eliminations, specifically, further include tags indicating what weapon the player avatar had equipped at that time. In some examples, a player elimination key event may include tags associated with the name of the opponent that eliminated the player and/or the weapon that was used to eliminate the player.

An instance provided to the ML system may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information.

In some embodiments, systems and methods described herein obtain a training dataset and identify one or more labels of the instances of the training dataset to detect events based on a comparison of labeled events against an application module. In some embodiments, the application module is predetermined. In some embodiments, the application module is developed and refined by the ML system by iterations of processing video information.

Figure 9:
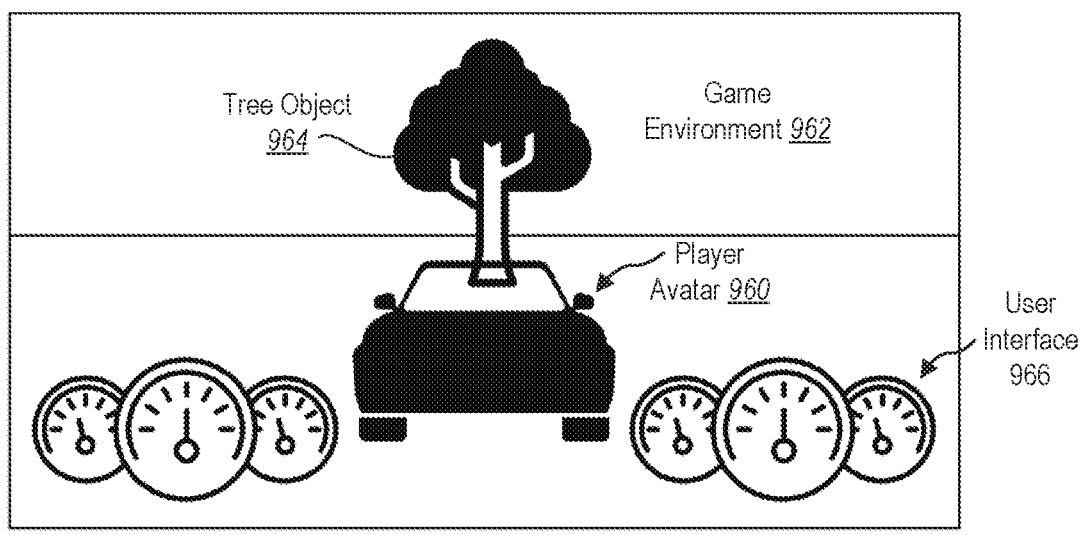
FIG. 9 is a video frame of video information for event detection, according to at least some embodiments of the present disclosure.

Systems and methods according to the present disclosure parse the video information by detecting objects in frames of the video information. In some embodiments, the objects include virtual objects positioned in the game environment such as illustrated in FIG. 9. The video information may reflect the player avatar 960, such as a car, moving within a three-dimensional or two-dimensional game environment 962, where the position of the virtual object 964 is associated with a three-dimensional position or two-dimensional position relative to the playing user's perspective in the video information. For example, in a first-person adventure game, the perspective of the playing user represents the player avatar's position within a three-dimensional game environment. The virtual objects in the environment move and scale depending on the movement of the player avatar 960 relative to the overall game environment 962 and/or depending on the movement of the virtual object 964 relative to the game environment 962.

The machine vision may use one or more image processing techniques to detect objects in the frames of the video information. In some embodiments, the machine vision may use edge detection and/or contrast detection to identify borders of objects or shading on objects. The edge of the virtual object may be detected by evaluating neighboring pixels or kernels of pixels for changes in contrast, color, or resolution. For example, an avatar's face may be lit by in-game light sources more than background objects. The variation in contrast may allow the machine vision to detect the edges of the avatar's face. In some examples, a wooden crate in the game environment may form a substantially straight edge that abruptly transitions from brown pixels to white pixels of the building wall behind the crate. The color transition may allow the machine vision to detect the edges of the crate. Edge detection on a virtual object allows for the determine of the size and shape of the virtual object in the game environment.

In FIG. 9, a frame of video information includes an object 964 (e.g., a tree) positioned in the game environment 962 with the player avatar 960, in this case a car. Other objects in the frame include the user interface (UI) 966 which may be independent of the three-dimensional game environment 962. The machine vision may identify the position, size, and shape of the tree object 964 relative to the player avatar 960 to determine relative position of the object 964 and the avatar 960 in the game environment 962. By evaluating the relative position of the object 964 and the avatar 960 in one frame or a sequence of frames (adjacent frames at the native framerate or non-adjacent key frames), the machine vision and/or ML system may identify a crash between the car and the tree. The crash may be identified as a key event and denoted as such relative to the social media metrics.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI 966. In other examples, a detected object that increases in size differently than the other objects in the game environment may be moving relative to the game environment. In the illustrated embodiment in FIG. 9, a crash key event may be identified by a change in the UI 966 depicting the speedometer rapidly and/or suddenly decreasing in value. For example, a rapid change in the UI 966 reflecting a change in speed of the car avatar 960 from 150 kilometers per hour (kph) to 0 kph in under 1.0 seconds may be identified as a crash.

A virtual object, as used herein, may include any object or element rendered or presented by the client device in the process of running the game application. For example, a virtual object may be an element of the UI 966. In some examples, a virtual object may be a player avatar 960. In some examples, the virtual object may be wall, floor, or other geometry of the game environment 962 such as a tree object 964. In some examples, the virtual object may be an interactive or movable object within the game environment, such as a door, crate, or power-up.

In some embodiments, the machine vision and/or ML model can identify objects in the game environment 962 without explicit training to identify the object. For example, a machine vision system that includes ML may learn to identify tree objects 964 within the game environment 962, even if the particular model of tree object 964 has not been explicitly taught to the machine vision system. In at least one example, systems and methods according to the present disclosure may be portable between video information from a variety of game applications where different models for common objects, such as tree object 964, are used. By training the ML model, the machine vision may be able to recognize and detect tree object 964 in the video information. In some examples, elements of the game environment are procedurally generated. A series of procedurally generated tree objects 964 may include common elements but be distinct models from one another, as rendered in the video information. Therefore, an explicitly provided model would be inapplicable to procedurally generated tree objects 964.

In some embodiments, the machine vision system invokes an application module that is associated with the game application that is the source of the video information. Art styles can vary considerably between game applications. Even a ML model that has been trained on video information from a plurality of game applications to detect tree objects 964 may fail when presented with a new art style. For example, while both a first game application and a second game application are competitive first-person shooter games, the appearance of objects may be very different between the games. Specifically, tree objects 964 and other elements of the game environment 962 appear very different between the two game applications.

Systems and methods according to the present disclosure may access an application module that is associated with the game application that is the source of the video information. The application module may be generated by the ML model based on the game engine, may include predetermined or user-defined events, or combinations of both.

As described herein, the ML model data may be stored remotely to the client device and/or the server computer and be accessed by the server computer as needed based on the video information or other information provided by the client device. In at least one embodiment, the ML model data is part of an application module including game application-specific information for machine vision and/or event identification and classification.

The object detection may include any of the methods or techniques described herein to identify the virtual objects in the video information. In some embodiments, the method includes determining the presence of a key event, a popular event, a rare event, or any other type of event based on the present of the object, texture, model, or animation. In some embodiments, determining the presence of an event includes evaluating a change in the virtual object, texture, model, or animation between frames of the plurality of frames. In some embodiments, compared frames are adjacent frames in the native framerate of the rendered game environment. For example, the video information may include 60 frames per second as the client device renders the game environment at 60 frames per second. The compared frames may be adjacent frames in the native 60 frames per second with a delta of approximately 16.67 milliseconds between frames. In some embodiments, the compared frames are key frames or other non-adjacent frames in the native framerate. For example, the video information may include 60 frames per second as the client device renders the game environment at 60 frames per second, but the compared frames are selected 0.25 seconds apart from one another or approximately 15 frames apart.

The changes to the virtual object between the first frame and the second frame may be calculated based on changes relative to the game environment, or changes based on expected correlations. Some changes in the virtual object relative to the game environment may include the appearance or disappearance of the virtual object in the game environment. The comparison of frames may include the detection of a particular animation of an avatar model or other model. A comparison of frames may include the detection of change in textures skinning a model, which may be associated with an event such as receiving damage or acquiring a new piece of equipment in the game.

In some embodiments, the determining the presence of at least one event in the video information includes comparing the detected object, texture, model, or animation to one or more events of an application module. As described herein, the application module may be predetermined or may be generated by a ML system. In some embodiments, the application module includes key events, popular events, rare events, any other types of events, or combinations thereof.

In at least one embodiment, key events are events that progress a gameplay session toward a resolution or definitive outcome. In some embodiments, key events may be predetermined in the application module specifically for the game application being played. Key events for an American football game application may include a touchdown, field goal, fumble, fumble recovery, sack, interception, punt, kickoff, halftime, or full time. Key events for a first-person shooter (FPS) game application may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application may include an opponent elimination, a player elimination, a health pickup, a shield pickup, an ability usage, a cooldown expiration, a multi-elimination, a round victory, a teammate elimination, PvE elimination (such as a minion elimination, a tower destruction, or an elimination); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interest to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, which are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience, which may result in greater social media value.

In some embodiments, the application module includes probability tables that allow the detection of rare events in the video information. For example, drop tables for a role-playing game may control the probability that a game engine provides a particular item to the player avatar in the game environment. If an item has a drop rate of 5.0%, a single detection of the item in the video information is, while uncommon by design, non-anomalous. However, if the method or system described herein detects the item dropping 5 out of 20 chances (a 0.000000147% chance), the sequence may indicate a rare event of interest. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate rare event of interest. The application module may include threshold values to determine when a series of probable events becomes sufficiently rare to be designated a rare event. In some embodiments, a probability curve may be calculated based on the drop table or other probability table, and a threshold may be set at a standard deviation away from a most likely outcome. In another embodiment, the threshold may be set manually, such that a detected rare event or sequence of events is reported when the occurrence exceeds the manually set threshold. In some embodiments, the social media value is at least partially related to the rarity of the rare event. For example, the social media value may be greater for a rarer event, as a rare event is more likely to generate engagement on social media.

While some embodiments of systems and methods for initiating and/or editing group captures evaluate only video information, some embodiments evaluate other forms of information or data to supplement the video information. In some embodiments, the comparison video obtained further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

In some embodiments, a plurality of identified events within a preset temporal proximity to one another may be recorded or reported to the user as an event amplitude. For example, a particular point in the video information or a portion of the video information with a high density of events may indicate a particularly climatic moment or sequence in the video information. The high density of events may be of particular interest to a viewer.

Event detection and/or categorization can allow the video tracks and/or software audio tracks of a group capture to provide multiple POVs on a single event of interest. For example, when an event is detected in both the first video track and second video track of a group capture, the event can be presented from multiple POVs and/or replayed from multiple POVs in an edited video. In some embodiments, when an event is detected from both the first user's POV and the second user's POV, that indicates the event is of unique interest to both users and the chat audio is more likely to be related to the event both users are witnessing at that time in the group capture.

In some embodiments, correlating events between the POVs may include detecting an event in a first video track and not detecting the event in the second video track. For example, a particular event may be visible in the first video track and not in the second video track and/or the particular event may be detected in the first video track and, while present in the second video track, unable to be detected due to the perspective, obstructions, or visual effects.

Figure 10:
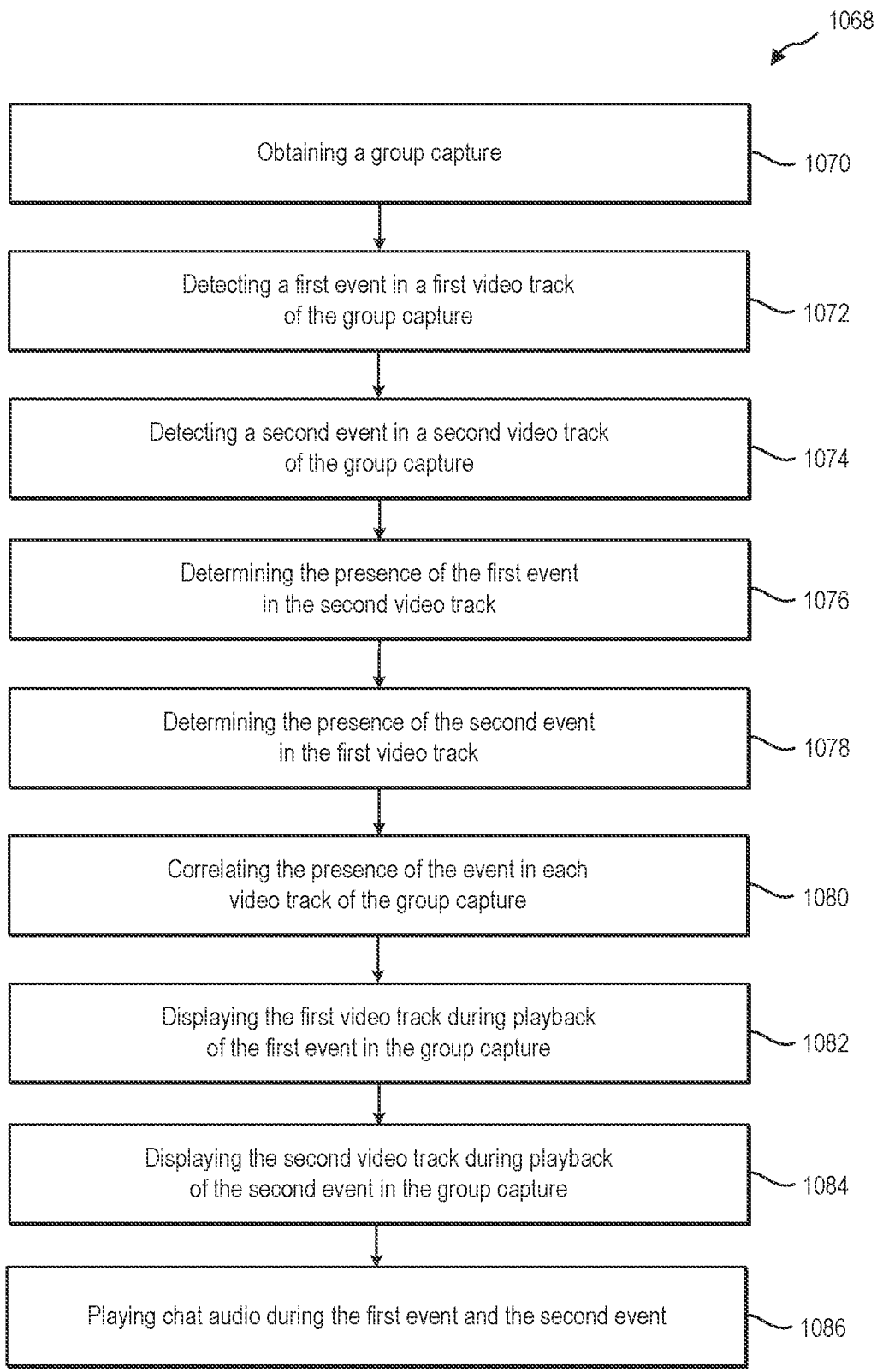
FIG. 10 is a flowchart illustrating a method of editing a group capture, according to at least some embodiments of the present disclosure.

FIG. 10 is a flowchart illustrating a method of automated editing and display of a group capture. The method 1068 includes obtaining a group capture at 1070. In some embodiments, obtaining a group capture includes transmitting a group capture request and receiving individual captures, such as described herein. In some embodiments, obtaining a group capture includes downloading a group capture from a server or a client device. In some embodiments, obtaining a group capture includes accessing the group capture on a server or other remote storage device. The group capture, as described herein, may be a single group capture file or a plurality of associated files.

The method 1068 includes detecting a first event in a first video track of the group capture at 1072 and detecting a second event in a second video track of the group capture at 1074. In some embodiments, the method includes detecting the first event and the second event in the group capture according to event detection methods described in relation to FIG. 8 and FIG. 9. For example, detecting the first event and the second event in the group capture may include obtaining an application module and/or ML model data related to the interactive software application of the group capture. In some embodiments, the event is a key event or other type of event that the developer of the game has previously identified. The developer can, therefore, ensure that the identified event is recognized by the application module and/or ML model such that an edit of the group capture displays the event. In doing so, the developer can exercise more control over the presentation of captures of the interactive software application, such as providing a more cinematic display of events in a group capture during play of a game application.

The method 1068 includes determining the presence of the first event in the second video track at 1076 and determining the presence of the second event in the first video track at 1078. In some embodiments, the first event and/or the second event is present in both the first video track and the second video track. In some embodiments, the first event is present in the first video track only. In some embodiments, the second event is present in the second video track only. When the first event is detected in the first video, additional information of the group capture may be used to attempt to determine the presence of the first event in the second video track.

For example, software audio information of the second software audio track may be evaluated for audio information associated with the first event. For example, the first event may be an elimination of an enemy character and, while the elimination is not visible in the second video track, audio cues associated with the elimination of the enemy character may be audible in the second software audio track corresponding to the second video track. In other examples, the first event may not be detected in the second video track due to obstructions, such as other virtual objects, animations, visual effects, particle effects, etc., that inhibit the object recognition and/or edge detection used to identify the first event. In such an example, game state data, such as described in relation to FIG. 6, may be used to determine the presence of the first event in the FOV of the second video track. For example, the game state data may include the location and orientation of an enemy at the time of the enemy elimination in the first event. While the second video track may lack sufficient video information to identify the first event independently, the game state data in conjunction with the first video track may allow the system to determine the presence of the first event in the second video track.

In some embodiments, the method 1068 optionally includes correlating the presence of the first event and second event in each video track of the group capture at 1080. For example, correlating events across video and audio tracks in the group capture can allow the video and audio from different client devices (and from multiple different perspectives and users) to be more precisely synchronized, which may improve and simplify the editing and display of the group capture.

The method 1068 further includes displaying the first video track during playback of the first event in the group capture at 1082 and changing the displayed video track to display the second video track during playback of the second event in the group capture at 1084. The automated display of the group capture will select the video and/or audio tracks of the group capture that display the detected events and change between the video and/or audio tracks to do so. The method 1068 further includes playing chat audio during the first event and the second event at 1086. The audio chat, in addition to the video tracks and software audio tracks, provides a group context to the group capture, allowing users to experience the social component of the event(s) captured.

Figure 11:
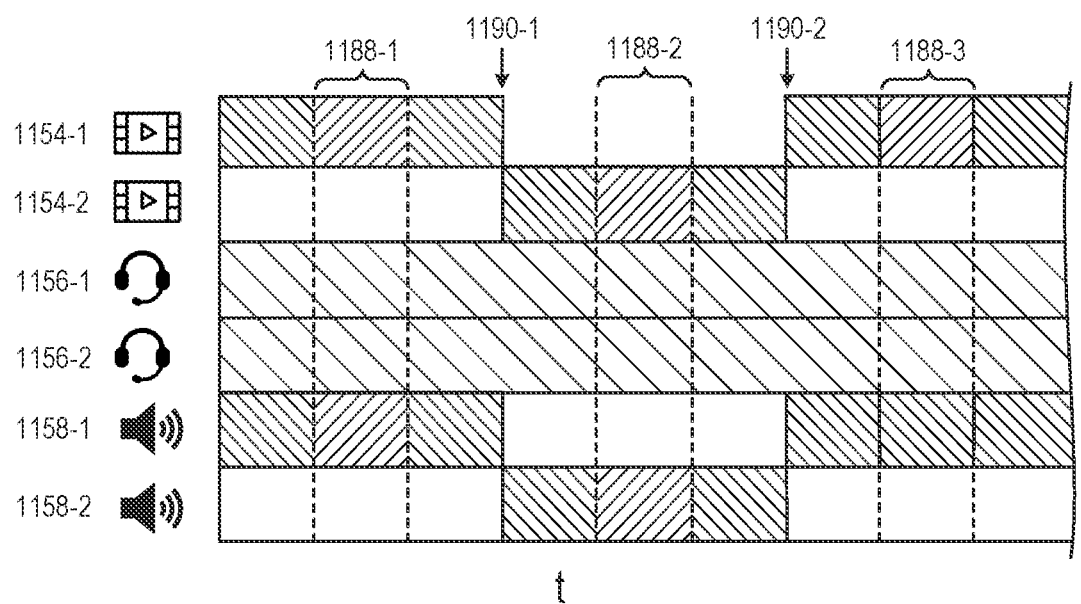
FIG. 11 is a timeline illustrating an automated group capture edit, according to at least some embodiments of the present disclosure.

FIG. 11 is a timeline that illustrates the automated selection and/or playback of different tracks of a group capture based on detected events, such as described in relation to FIG. 10. In some embodiments, the group capture includes a first video track 1154-1, a second video track 1154-2, a first chat audio track 1156-1, a second chat audio track 1156-2, a first software audio track 1158-1, and a second software audio track 1158-2.

For example, there are three detected events in the timeline: a first event 1188-1 detected in the first video track 1154-1, a second event 1188-2 detected in the second video track 1154-2, and a third event 1188-3 detected in the third video track 1154-3. The timeline for display of the group capture displays the first video track 1154-1 during the first event 1188-1 and plays the first software audio track 1158-1 during the same portion of the timeline until the first transition 1190-1.

After the first transition, the timeline displays the second video track 1154-2 that includes the detected second event 1188-2 and plays the second software audio track 1158-2 associated with the second video track 1154-2. Between the second event 1188-2 and the third event 1188-3, the timeline has a second transition 1190-2 at which the timeline switches to display the first video track 1154-1 and first software audio track 1158-2 including the detected third event 1188-3. As the video and software audio transition between the individual captures from the different client devices, both the first chat audio track 1156-1 and the second chat audio track 1156-2 are played to provide both sides of the conversation that occurred during the detected events. For example, while the first user and the second user were performing different tasks (as different events were detected independently in the video tracks), the users may have been discussing the events while experiencing the events during the group capture.

Figure 12:
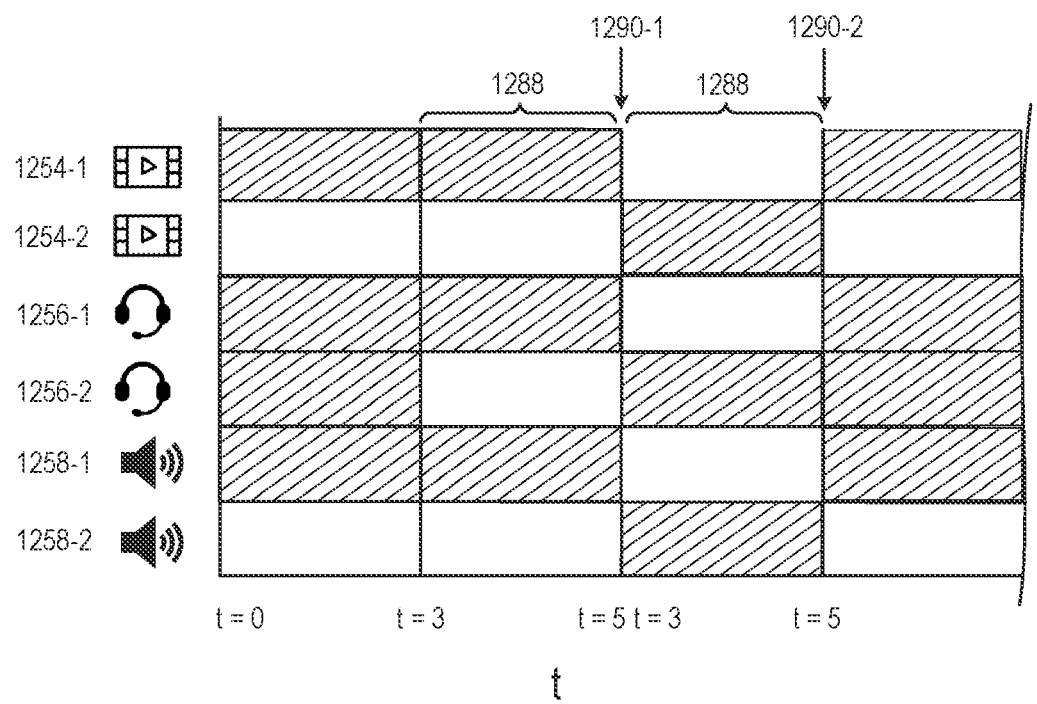
FIG. 12 is a timeline illustrating another automated group capture edit, according to at least some embodiments of the present disclosure.

In other examples, the group capture can allow the chat audio tracks to be played separately to allow the chat audio of each user to be heard during the display of the video track associated with that user and client device. For example, FIG. 12 is a timeline that illustrates the automated selection and/or playback of different tracks of a group capture based on a detected event in more than one video track, such as described in relation to FIG. 10. In such an example, both the first user and the second user may have observed the same detected event from different POVs (i.e., from each user's respective location and FOV in the virtual environment) and each user's chat audio may reflect his or her narration or commentary on their perspective of the event.

In some embodiments, the group capture includes a first video track 1254-1, a second video track 1254-2, a first chat audio track 1256-1, a second chat audio track 1256-2, a first software audio track 1258-1, and a second software audio track 1258-2. The timeline begins by displaying the first video track 1254-1, the first chat audio track 1256-1 and the second chat audio track 1256-2, and the first software audio 1258-1 associated with the first video track 1254-1. The timeline illustrates a single detected event 1288 that is displayed first upon viewing the group capture by displaying the first user's POV and then displaying the event 1288 again from the second user's POV. For example, the timeline displays the first video track 1254-1, the first chat audio track 1256-1, and the first software audio track 1258-1 for the first iteration of the event 1288 until the first transition 1290-1, and the timeline displays the second video track 1254-2, the second chat audio track 1256-2, and the second software audio track 1258-2 for the second iteration of the event 1288 until the second transition 1290-2. The timeline, in some embodiments, selectively plays only the chat audio track associated with the simultaneously displayed video track during the event(s) 1288. After the event 1288 is displayed, both chat audio tracks 1256-1, 1256-2 are played to provide both sides of the conversation.

In some embodiments, the replaying of the event 1288 from multiple perspectives with the individual reactions and commentary from each chat audio track can allow a cinematic display of the event 1288 from multiple angles and users. Such an automated editing method may be beneficial for narrative-driven experiences, such as in game applications. In some embodiments, a developer can communicate with a server via an application programing interface (API) to provide a particular type of display or editing for group captures that include a particular event in the game application. In a specific example, a game may include a dungeon that requires each member of a four-person party to stand on different platforms at the same time to open the dungeon gate. In such an example, the gate opening may be identified by the developer as a key event in the capture, and the developer can, via the API instruct a server or client device displaying the group capture to display that key event (the gate opening) from the perspective of each user sequentially to cinematically display the event and provide each user's individual reactions to the event via the chat audio tracks.

In at least one embodiment, a group capture according to the present disclosure allows for one user to initiate individual video and audio captures from a plurality of client devices and then access the associated individual captures in a single group capture. In some embodiments, the group capture can be automatically edited to provide an engaging and cinematic presentation of the events the users experienced in the group capture.

INDUSTRIAL APPLICABILITY

The present disclosure relates generally to systems and methods for improving social sharing of video information produced by a game application or other interactive software application. Systems and methods described herein provide remote activation of video and/or audio capture on client devices. In some examples, a plurality of users may interact, cooperate, or compete in an interactive software application, and a coordinated capture of video information can allow the users to view or edit the video information of an event in the interactive software application from multiple perspectives. In some embodiments, the group capture includes group chat audio to provide social context to the events of the interactive software application. In some embodiments, the group capture includes video information platform- or network-specific groups, such as previously confirmed friends within an online social network, to opt into the group capture. In some embodiments, the group capture includes video information from application-specific groups, such as cooperative teams or parties within a game application. In other examples, the group capture includes video information from competitive users, such as opponents in a game application. In some embodiments, the group capture includes dynamically defined groups based on conditions of the interactive software application, such as other players (with or without prior party or friend confirmation) in proximity within a game environment or engaged in the same task in the game environment. In some embodiments, a machine learning (ML) system evaluates the video information of the user's gameplay with the machine vision system in addition to evaluating associated audio information, game state data, user inputs, or combinations thereof of the user's gameplay to detect events and/or objects in user's gameplay. The detected objects and events are then identified and/or classified dynamically create groups for group capture.

In some embodiments, a system for group capture of video information from an interactive software application includes a plurality of client devices and at least one server computer in communication via a data network. The system includes a plurality of client devices each running an interactive software application. The client devices are in data communication with a server computer via a data network. In some embodiments, each client device is a computing device with a processor and hardware storage device in communication with the processor. In some embodiments, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device is local to and/or integrated with the client device. In some embodiments, the hardware storage device is accessed by the client device through a network connection.

The processor may execute an interactive software application, such as a game application, which is stored on the hardware storage device to render video information at least partially in response to user inputs to the client device. In some embodiments, the client device includes a display device to display the video information to a playing user. For example, the client device may be a dedicated gaming console with an integrated display (e.g., NINTENDO SWITCH) or a general-purpose computer with an integrated display (e.g., a laptop computer). In some embodiments, the client device is in communication with a display device to display video information to a playing user. For example, the client device may be a gaming console (e.g., MICROSOFT XBOX) that outputs the video information to a connected display device (e.g., a television) for display to a playing user.

In some embodiments, the client device includes a user input device to receive user inputs from a playing user. For example, the client device may be a dedicated gaming console with an integrated user input device (e.g., NINTENDO SWITCH) or a general-purpose computer with an integrated user input device (e.g., a laptop computer). In some embodiments, the client device is in communication with a user input device to receive user inputs from a playing user. For example, the client device may be a gaming console (e.g., MICROSOFT XBOX) that receives user inputs via wired or wireless communications from a user input device (e.g., a controller) of a playing user. In some embodiments, the user input device is a headset configured to receive and transmit chat audio between users of the client devices and/or other users via the data network.

In some embodiments, the client device is located remotely from the display device and/or the user input device. For example, the client device may be a game server or part of a server blade that executes a game application or other interactive software application and streams at least the video information to the connected display device while receiving user inputs from a connected user input device. It should be understood that the user of the client device may, therefore, be remote from the client device.

In some embodiments, the video information or a portion of the video information is also transmitted to a server computer via a data network. In some embodiments, the server computer is located remotely from the client device and the data network is or includes the World Wide Web. For example, the client device may be connected to the data network via the playing user's home internet connection, and the server computer may be located in a datacenter. In some embodiments, the server computer is located locally to the client device and the video information is transmitted over a local area network or a direct data connection. For example, a competitive electronic game tournament (e.g., an eSports competition) may have a local data network to which all client devices used for the competition are connected. A server computer connected to the local data network may communicate with the client devices used for the competition.

In some embodiments, a first user of the first client device may interact with a second user of the second client device and/or a third user of the third client device when each of the client devices is executing the same game application. For example, when each of the client devices is executing the same game application, the first client device, the second client device, and third client device may be in data communication for online gameplay, such as multiplayer gameplay.

In some embodiments, the first user of the first client device may interact with the second user of the second client device and/or the third user of the third client device when each of the client devices is in communication with the same software platform or social network via the server. For example, the first game application and second game application may be different electronic games (and the first user and second user may not be interacting in a game environment), but the first user of the first client device and the second user of the second client device may interact or engage outside of the game applications, such as in a group chat function facilitated by the server that is independent of a game.

In a conventional system, a user can initiate a video and/or audio capture of the video information and/or audio information provided by the client device used by the user. However, when users are playing cooperatively or competitively, capturing only the first user's perspective on an event in a game environment can omit rememberable or entertaining in-game or social events. In some embodiments, systems and methods according to the present disclosure allow a first user to initiate a group capture of video and/or audio information from each client device in a group. For example, a first user may request, via the first user input device, a group capture through the first client device. The group capture request is transmitted to each client device in the group (e.g., the second client device and the third client device) to initiate a video and/or audio capture at each client device. The individual captures at each client device are then uploaded to the server, where the individual captures are associated in a group capture. The server then provides access to the group capture for each user (e.g., user account) contributing to the group capture. In some embodiments, the individual captures include video information from the interactive software application, audio information from the interactive software application, chat audio from the group chat, or combinations thereof, FIG. 2-1 through 2-3 schematically illustrates an embodiment of a process of initiating and disseminating a group capture. FIG. 2-1 illustrates a first client device with a first user account, a second client device with a second user account, a third client device with a third user account, and a server in data communication with one another. In some embodiments, the server is a single server that receives and transmits the group capture requests, as well as receives and/or transmits the video and/or audio information of the captures. In some embodiments, a first server (e.g., a social network server) receives and transmits the group capture requests, and a second server (e.g., a multimedia server) receives and/or transmits the video and/or audio information of the captures.

In some embodiments, the first client device sends a group capture request to the server. The server then sends individual capture requests to each of the client devices in the group. For example, the server transmits a second individual capture request to the second client device and a third individual capture request to the third client device. In some embodiments, the first client device initiates an individual capture at or near the time the first client device transmits the group capture request without receiving a first individual capture request from the server. In some embodiments, the server sends a first individual capture request to the first client device.

In FIG. 2-2, in response to receiving the individual capture requests described in relation to FIG. 2-1, the client devices each capture video and/or audio information in an individual capture and upload the individual captures to the server. After receiving the individual captures, the server associates the individual captures with one another in a group capture and provides access to the group capture to each of the client devices and/or to the user accounts (e.g., the first user account, second user account, third user account) active on the client devices during the group capture. For example, the server may provide access to user account, and the user account, irrespective of a device used to access the server, has access to the group capture. In a specific example, the first individual capture may be provided from the first client device and a first user account logged into the first client device at the time of capture may access the group capture from a different device, such as a smartphone or laptop computer. In some embodiments, the group capture is stored on the server and is accessible by the client devices and/or user accounts. In some embodiments, the group capture is downloadable from the server by the client devices and/or user accounts. In some embodiments, the group capture is pushed to the hardware storage device of the client devices.

FIG. 3 is a flowchart illustrating an embodiment of a method of initiating a group capture of an interactive software application. The method includes, at a server, determining a capture group wherein the capture group includes a plurality of client devices. In some embodiments, each of the client devices has a user account active on the client device, where a user account provides identification of a user on an online platform, such as an electronic game social network used for multiplayer game modes and matchmaking. For example, the first client device has a first user account logged in and active, and a second client device has a second user account logged in and active.

The capture group may be determined through one or more criteria. For example, the first user account (User 1) and second user account (User 2) may be confirmed platform friends on the online platform. In some embodiments, the capture group includes any confirmed platform friends that are online and active, irrespective of the software application being used by the user accounts. For example, User 1 and User 2 are confirmed platform friends and both online on the platform, while User 1 is playing a first game application and a User 2 is playing a second game application. In such an example, the capture group may include User 1 and User 2.

In some embodiments, the capture group includes select confirmed platform friends that are online and active, irrespective of the software application being used by the user accounts. For example, User 1, User 2, and User 3 are confirmed platform friends and all online on the platform, while User 1 is playing a first game application, User 2 is playing a second game application, and User 3 is playing a third game application. In such an example, the capture group may include a subset of the confirmed friends, such as User 1 and User 2, where the subset is preselected by one or more of the users.

In some embodiments, the capture group includes users of the platform that are online in a predefined party or group on the platform, irrespective of the software application being used by the user accounts. For example, User 1 invites User 2 and User 3 to join a party. User 2 and User 3 accept the invitation and join the party, while User 1 is playing a first game application, User 2 is playing a second game application, and User 3 is playing a third game application. In such an example, the capture group the party members: User 1, User 2, and User 3.

In some embodiments, the capture group includes any confirmed platform friends that are online and active, and the user accounts are using the same software application. For example, User 1, User 2, and User 3 are all confirmed platform friends, but only User 1 and User 2 are playing the same game application while User 3 is playing a different game application. In such an example, the capture group includes User 1 and User 2 and not User 3.

In some embodiments, the capture group includes any confirmed platform friends that are online and active, and the user accounts are using the same software application together in the same instance of the software. For example, User 1, User 2, User 3, and User 4 are all confirmed platform friends, but only User 1, User 2, and User 4 are playing the same game application while User 3 is playing a different game application. User 1 and User 2 are playing together in shared instance round of competitive multiplayer mode (e.g., in the same round of online play together), while User 4 is playing in a solo campaign mode. In such an example, the capture group includes User 1 and User 2 and not User 3 (different game) or User 4 (different instance).

In some embodiments, the capture group includes any user accounts that are engaged with one another in an in-application party, irrespective of confirmed platform friend status between the user accounts. For example, a game application may assign user accounts to a party of four users together for a task, mission, or team during online play in the game application. In such an example, the user accounts may or may not be confirmed platform friends, and the capture group may include the four members of the in-application party for the duration of the time the users are members of the in-application party.

In some embodiments, the capture group includes any user accounts that are engaged with a shared in-game event or task, irrespective of confirmed platform friend status or in-application party status between the user accounts. For example, an interactive software application may allow users to interact with one another and a shared open world within an instance of the virtual environment. The shared open world may allow the first user and second user to engage cooperatively or competitively in a world event in the shared open world. For example, a world event may be triggered by a user or may be initiated based on a timer or schedule that allows any players in the local region of the game environment to join in the world event. A particular example of a world event is a dragon appearing in a particular region of a massively-multiplayer online role-playing game (MMORPG), and any avatars located in the region can engage with and fight the dragon. In such an example, the user accounts controlling the avatars may or may not be confirmed platform friends, and the capture group may include any user accounts controlling any avatar engaged with the world event for the duration of the time the users are engaged with the world event.

In some embodiments, the capture group includes any user accounts that are present within an in-application region or radius around an avatar controlled by the first user account in the in-application virtual environment, irrespective of confirmed platform friend status or in-application party status between the user accounts. For example, an interactive software application may allow users to interact with one another and a shared open world within an instance of the virtual environment. The shared open world may allow the first user and second user to engage cooperatively or competitively in the shared open world. As described herein, world events or other events or locations in the in-application virtual environment may draw user avatars into proximity with one another. Capturing game video, game audio, and chat audio from any user accounts with an avatar in proximity to the avatar of the first user account may allow a group capture that includes multiple perspectives and commentary on an event or location in the interactive software application. In such an example, the user accounts controlling the avatars in the region or in a radius around the user avatar may or may not be confirmed platform friends, and the capture group may include any user accounts controlling any avatar within the region or within a radius around the user avatar.

In some embodiments, the presence of user accounts in a capture group persists for any user accounts within the capture group at any time during the requested capture duration. For example, presence of user accounts in a capture group persists for any user accounts engaged in a world even (or an in-application party or other temporary affiliations) for a pre-determined period of time (e.g., 10 seconds, 30 seconds, 60 seconds, etc.) such that a user can initiate a group capture for such period of time after the termination and still have the system determine the user accounts to be part of the capture group for the purpose of capturing the world event (or other shared experience of the capture group).

After or during determination of the capture group, the method may include checking capture permissions of any user accounts determined to be part of the capture group. For example, a system setting of a user account may include an opt-in requirement for group captures on the platform and/or the interactive software application. In such examples, a user account that is determined to part of the capture group is added to the capture group only if the user account has opted in. In some examples, a system setting of a user account may include an opt-out option for group captures on the platform and/or the interactive software application. In such examples, a user account that is otherwise determined to part of the capture group is removed from or not added to the capture group when the user account has opted out.

In some embodiments, the method includes receiving, at a server, a group capture request. The group capture request is provided by the first client device of the capture group. In some embodiments, the group capture request is transmitted to the server from the first client device based at least partially on a user input to the first client device. For example, the first user may initiate a group capture request from a controller or other user input device. In some embodiments, the group capture request is transmitted by the first client device based at least partially on a command, trigger, or prompt from the interactive software application. For example, an event or achievement or setting in the interactive software application may instruct the first client device to transmit a group capture request to the server.

The method further includes transmitting an individual capture request to at least a second client device of the plurality of client devices. In some embodiments, transmitting an individual capture request to at least a second client device of the plurality of client devices includes also transmitting an individual capture request to the first client device. For example, in response to the group capture request, the server transmits individual capture requests to all members of the capture group (and according to permissions). In some embodiments, transmitting an individual capture request to at least a second client device of the plurality of client devices includes transmitting an individual capture request to all client devices in the capture group (and according to permissions) other than the first client device. In such examples, the first client device initiates an individual capture at the first client device at substantially the same time as transmitting the group capture request to the server, meaning the first client device initiates the individual capture without receiving an individual capture request from the server. In at least one example, the server transmits an individual capture request to the first client device, and the first client device ignores the individual capture request in the event the first client device has already initiated an individual capture associated with the group capture request.

After transmitting an individual capture request, the method further includes receiving a first individual capture from the first client device and a second individual capture from a second client device. In some embodiments, the method further includes receiving individual captures from each of the client devices in the capture group (and according to permissions).

In some embodiments, at least one of the individual captures includes video information, software audio (e.g., game audio of a game application), and chat audio from a microphone in data communication with the client device. In some embodiments, the first individual capture includes video information, software audio (e.g., game audio of a game application), and chat audio from a microphone in data communication with the first client device and the second individual capture includes video information, software audio (e.g., game audio of a game application), and chat audio from a microphone in data communication with the second client device. In some embodiments, each individual capture of each client device includes video information, software audio (e.g., game audio of a game application), and chat audio from a microphone in data communication with the respective client device. In some embodiments, the server receives and transmits chat audio from each of the members of a platform-level party or in-game party. For example, the individual captures may include the video information and software audio from the respective client devices, and chat audio for the group capture is captured at the server.

In some embodiments, at least one individual capture includes game state data. Game state data includes any information that may allow an electronic device to recreate at least part of a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

In some embodiments, at least one individual capture includes user inputs, such as directional inputs, analog trigger or button inputs, or other user inputs from a user input device. A user input, according to the present disclosure, should be understood to include any signal or input by any input mechanism that provides instructions to the client device to interact with and/or affect the game application. The user input information may provide additional context to the events in the individual capture.

The method further includes associating the first individual capture with the second individual capture in a group capture. In some embodiments, associating the first individual capture and the second individual capture includes merging the individual captures (and any other individual captures received in response to the group capture request) into a single file (i.e., "a group capture file")

In some embodiments, associating the first individual capture and the second individual capture includes appending or altering metadata of the individual captures to identify the individual captures as part of the group capture. In such an example, a query, for example from editing software or from a client device, for the group capture will return all individual capture files with a header or other metadata that includes the group capture identifier (ID).

In some embodiments, associating the first individual capture and the second individual capture includes creating a group capture ID file that includes unique file identifications for each of the individual captures. For example, the group capture ID file may not include the individual captures, but rather identifies the individual captures in the group capture for access or retrieval.

As described herein, in some embodiments, the chat audio for each user account in the capture group is captured at the respective client devices as part of or simultaneously with the individual capture. In some embodiments, the server receives and transmits chat audio from each of the members of a platform-level party or in-game party. For example, the individual captures may include the video information and software audio from the respective client devices, and chat audio for the group capture is captured at the server.

The method further includes providing access to the group capture to at least the first client device and the second client device. In some embodiments, the server provides access to the client devices while the respective user accounts are logged in and active on the client devices. In other words, the server provides access to the group capture to the user accounts of the capture group. In some examples, the user accounts may subsequently access the group capture from other electronic devices, other than the client devices used for the individual captures.

In some embodiments, providing access to the group capture includes making the group capture (either a single group capture file or a plurality of associated files) available for download by the user accounts. For example, a first user account logged in via the first client device may download the group capture to the first client device. In another example, a second user account of the capture group may access and download the group capture to a personal computer for editing. In some embodiments, providing access to the group capture includes pushing the group capture to the client devices (e.g., to the hardware storage devices) of the capture group for viewing or editing. Pushing the group capture to the client devices can allow the group capture to be deleted from the server hardware storage device and limit a storage burden on the server side. In some embodiments, retaining the group capture on the server hardware storage device allows the individual captures to be deleted from the client devices, which prevents group capture requests from a first client device filling the hardware storage device of a second client device unintentionally. Additionally, a client device with a hardware storage device at or near capacity may be unable to capture the individual capture for upload to the group capture. In some examples, by deleting the individual capture from the hardware storage device on the client device each time, the client device can retain enough free space in the hardware storage device to continue capturing individual captures for group captures.

In some embodiments, a capture group is defined based on four users in an in-game party, such as on a cooperative team in a multiplayer (PvE or PvP) game mode. User 1, User 2, User 3, and User 4 are each a member of the in-game party and, therefore, members of the capture group in the event a group capture request is received at the server.

In some embodiments, permissions or other statuses of the user can alter the capture group from the default determination. In some examples, a party has the same four users in an in-game party in which User 2 has, in user account or system settings, opted out of group captures. The capture group is thereby altered or limited to include User 1, User 3, and User 4 of the in-game party that have affirmatively opted-in or not opted-out. In some examples, a party has the same four users in an in-game party in which User 1, User 2, and User 3 are confirmed platform friends on the online platform through which the in-game party is managed. In such an example, the capture group includes the confirmed platform friends that are also members of the in-game party. In some embodiments, the permission settings allow users to opt-in or opt-out of portions of the group capture. In some examples, a party has the same users in which the third user has, in user account or system settings, opted out of chat audio in group captures. Therefore, the capture group remains the confirmed platform friends that are also members of the in-game party, however, the chat audio for User 3 is not captured and/or not associated with the group capture. In at least one embodiment, other users can opt-out of capturing certain users' or portions of users' video and audio. For example, User 1 may not want to capture the chat audio (due to quality, content, or noise) of User 2, and may choose to exclude User 2's chat audio from the group capture.

A group capture can allow more immersive video and audio clips while also providing simpler editing of content with multiple perspectives. Because the group capture may include chat audio, the different video tracks and audio tracks (including chat audio) may benefit from synchronization at the server level. In some embodiments, the server can transmit individual capture requests in response to a group capture request that includes a timestamp.

In some embodiments, an individual capture request is received at a client device at t=0 when the individual capture request is based on a group capture request received at the server at an earlier time. In some embodiments, the group capture request is timestamped at the earlier time. The individual capture request instructs the client device to capture a period of time prior to the timestamp at a capture start time. The client device may capture a 30-second individual capture, a 60-second individual capture, or other period of time prior to the capture start time. In some embodiments, the capture buffer is different between channels or tracks of the individual capture. For example, a video track may have a different buffer length (e.g., 30 seconds) from the chat audio track (e.g., 60 seconds) and the software audio track (e.g., 30 seconds). In some embodiments, the capture buffer for each track may be different for different users or client devices of the capture group. By synchronizing the capture from the timestamp of the group capture request, any variations in the transmission or processing of the individual capture requests can be limited or removed.

As described herein, game state data includes any information that may allow an electronic device to recreate at least part of a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

In some embodiments, the game state data is captured as part of each individual capture. For example, the game state data of the avatar controlled by the user account associated with the client device may be captured as part of the individual capture of the client device. Each individual capture, therefore, includes part of the game state data for the virtual environment or game instance in which the capture group has avatars. In some embodiments, the server may compile the game state data from individual captures into game state data for the group capture.

In some embodiments, the game state data is obtained from a multiplayer server and compiled with individual captures to provide game state data for the group capture. For example, the multiplayer server may coordinate the state of the virtual environment for a plurality of client devices in a game instance. The multiplayer server may, therefore, have game state data that identifies each of the avatars associated with the user accounts of the capture group. In such examples, the multiplayer server has game state data for non-player characters (NPC) and other objects in the virtual environment.

Because the game state data provides location and orientation of avatars in the virtual environment, the game state data can allow awareness of the point of view (POV) of each individual capture in the group capture. For example, the in-game party includes four users, of which three are confirmed platform friends and part of the capture group.

A first user avatar has a first field of view (FOV) within the virtual environment. The first individual capture from the first client device may reflect the POV of the first user avatar, which includes video information from the first FOV and software audio of the environment and other audio prompts (which may include additional audio information beyond that which is visible in the first FOV) from the location and/or orientation of the first user avatar in the virtual environment. A second user avatar has a second FOV within the virtual environment. The second individual capture from the second client device may reflect the POV of the second user avatar, which includes video information from the second FOV and software audio of the environment and other audio prompts (which may include additional audio information beyond that which is visible in the second FOV) from the location and/or orientation of the second user avatar in the virtual environment. The third individual capture from the third client device may reflect the POV of the third user avatar, which includes video information from the third FOV and software audio of the environment and other audio prompts (which may include additional audio information beyond that which is visible in the third FOV) from the location and/or orientation of the third user avatar in the virtual environment.

In some embodiments, the game state data of the group capture includes the location and/or orientation of other members of the in-game party for whom the group capture does not have video information and/or audio information. For example, a non-group avatar is present in the virtual environment, and the location of the non-group avatar is known in the game state data to provide context to the virtual environment and identification of the non-group avatar in the case that non-group avatar is visible in the FOV of one of the video tracks of the group capture. For example, the third user avatar is visible within the second FOV, and the game state data can provide such information to a viewer of the group capture and/or the game state data for the group capture.

By providing location (and other) information about an NPC or other objects in the virtual environment, a viewer of the group capture and/or the game state data for the group capture can easily identify which FOV contains the NPC to simplify editing. Further, a viewer of the group capture may use the game state data to visualize the available video and/or audio tracks in the context of the virtual environment. In some embodiments, a user interface (UI) may allow the viewer to select the user avatars in a visualization to change the video and/or audio track to that of the selected user avatar during viewing. For example, the game state data may indicate to a view that any of the first FOV, the second FOV, or the third FOV include the NPC, while the second FOV includes the NPC, the first user avatar, and the third user avatar. The viewer may change the video and/or audio track to the second FOV of the second user avatar to see more of the scene.

In some embodiments, a single file (or a plurality of files accessed by an editing software and edited concurrently in a single video project) has multiple video tracks, multiple software audio tracks, multiple chat audio tracks. In some embodiments, a group capture file includes a plurality of video tracks, a plurality of chat audio tracks, and a plurality of software audio tracks. For example, the chat audio tracks may each be associated with a different user of the group capture in the chat audio between the members of the capture group. The first chat audio track, in some embodiments, captures only the chat microphone of the first user from the first client device. During editing or viewing, a viewer may select individual tracks from the group capture at any given time. For example, an editor may choose to display the first video track and first software audio track with the second chat audio, such that the view visualizes the virtual environment of the group capture from the POV of the first user while hearing the chat audio commentary of the second user.

In some embodiments, a single group capture file (or a plurality of files accessed by an editing software and edited concurrently in a single video project) has multiple video tracks, multiple software audio tracks, merged chat audio tracks. In some embodiments, a group capture file includes a plurality of video tracks, a single chat audio track, and a plurality of software audio tracks. In some embodiments, the chat audio is merged from the plurality of chat audio tracks from the individual captures. In some embodiments, the chat audio is a single track that is obtained from the server, as described herein.

A group capture (either a single file or a plurality of associated files) as described herein can allow for more immersive, more social, and more cinematic captures of a virtual environment, such as a game environment. In some embodiments, the server or a client device can provide at least partially automated editing to create an edit of the group capture for later viewing, sharing, or downloading by one or more of the members of the capture group.

In some embodiments, the system for automated initiation and/or editing of group captures is configured to detect one or more events during usage or gameplay of an interactive software application, where a group of users on different client devices are interacting in the interactive software application. In some embodiments, the system is configured to detect one or more events in real-time. In some embodiments, the system is configured to detect one or more events in a group capture that is independently initiated. In some examples, the group capture is initiated by a user input from a client device. In some examples, the group capture is initiated by a software application of the client device. In some examples, the group capture is initiated by a server.

The server computer includes a processor and a hardware storage device in data communication with the processor. The hardware storage device has instructions stored thereon that, when executed by the processor, cause the server computer to perform any of the methods described herein. For example, the server computer may detect events in the video information to classify different events and/or objects based on identified textures, models, animations, or other criteria.

In at least one embodiment, the server computer includes or is in communication with a machine learning (ML) model that detects and/or reports events in the video information to evaluate the video information and identify and tag events.

In some embodiments, the server computer has stored thereon (e.g., in the hardware storage device) a ML model that accesses and/or communicates with ML model data. In some examples, the ML model data is stored locally to the server computer. In some examples, the ML model data is stored remotely from the server computer and accessed by the server computer via the data network. For example, the ML model data may be aggregated from and/or refined by a plurality of ML models executed by a plurality of server computers. The ML model data may be updated based on the outputs of the ML models, with the most current ML model data made available for the ML model running on the server computer when needed.

As illustrated in the foregoing discussion, the present disclosure utilizes a variety of terms to describe features and advantages of the ML model. Additional detail is now provided regarding the meaning of such terms. For example, as used herein, a "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model.

In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain events. The ML system may perform one or more machine vision techniques to evaluate the video information for associated events when the UI notification is present. The ML system may refine over iterations to "learn" when visual events are correlated with the UI notification. For example, a UI element indicating player avatar health may increase in value in response to the player avatar interacting with a health pack in the game environment.

In some embodiments, the ML system can create an application module of expected or correlated events in the video information. In a particular example, if the UI element indicates that the playing user has performed an opponent elimination, other aspects of the video information may be detected and/or identified to associate opponent eliminations with the identified animation. In another example, each time a player avatar performs an assist, the ML system may identify to whom the player avatar passed the ball for the goal (such as in sports games including Rocket League or FIFA). Further, the ML system can create or refine an application module to include commonly queried or associated categories of tags for events. In some examples, all key events may be associate with a match timestamp, while opponent eliminations, specifically, further include tags indicating what weapon the player avatar had equipped at that time. In some examples, a player elimination key event may include tags associated with the name of the opponent that eliminated the player and/or the weapon that was used to eliminate the player.

An instance provided to the ML system may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information.

In some embodiments, systems and methods described herein obtain a training dataset and identify one or more labels of the instances of the training dataset to detect events based on a comparison of labeled events against an application module. In some embodiments, the application module is predetermined. In some embodiments, the application module is developed and refined by the ML system by iterations of processing video information.

Systems and methods according to the present disclosure parse the video information by detecting objects in frames of the video information. In some embodiments, the objects include virtual objects positioned in the game environment. The video information may reflect the player avatar, such as a car, moving within a three-dimensional or two-dimensional game environment, where the position of the virtual object is associated with a three-dimensional position or two-dimensional position relative to the playing user's perspective in the video information. For example, in a first-person adventure game, the perspective of the playing user represents the player avatar's position within a three-dimensional game environment. The virtual objects in the environment move and scale depending on the movement of the player avatar relative to the overall game environment and/or depending on the movement of the virtual object relative to the game environment.

The machine vision may use one or more image processing techniques to detect objects in the frames of the video information. In some embodiments, the machine vision may use edge detection and/or contrast detection to identify borders of objects or shading on objects. The edge of the virtual object may be detected by evaluating neighboring pixels or kernels of pixels for changes in contrast, color, or resolution. For example, an avatar's face may be lit by in-game light sources more than background objects. The variation in contrast may allow the machine vision to detect the edges of the avatar's face. In some examples, a wooden crate in the game environment may form a substantially straight edge that abruptly transitions from brown pixels to white pixels of the building wall behind the crate. The color transition may allow the machine vision to detect the edges of the crate. Edge detection on a virtual object allows for the determine of the size and shape of the virtual object in the game environment.

In some embodiments, a frame of video information includes an object (e.g., a tree) positioned in the game environment with the player avatar, for example the above-referenced car. Other objects in the frame include the user interface which may be independent of the three-dimensional game environment. The machine vision may identify the position, size, and shape of the tree object relative to the player avatar to determine relative position of the object and the avatar in the game environment. By evaluating the relative position of the object and the avatar in one frame or a sequence of frames (adjacent frames at the native framerate or non-adjacent key frames), the machine vision and/or ML system may identify a crash between the car and the tree. The crash may be identified as a key event and denoted as such relative to the social media metrics.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI. In other examples, a detected object that increases in size differently than the other objects in the game environment may be moving relative to the game environment. In some embodiments, a crash key event may be identified by a change in the UI depicting the speedometer rapidly and/or suddenly decreasing in value. For example, a rapid change in the UI reflecting a change in speed of the car avatar from 150 kilometers per hour (kph) to 0 kph in under 1.0 seconds may be identified as a crash.

A virtual object, as used herein, may include any object or element rendered or presented by the client device in the process of running the game application. For example, a virtual object may be an element of the UI. In some examples, a virtual object may be a player avatar. In some examples, the virtual object may be wall, floor, or other geometry of the game environment such as a tree object. In some examples, the virtual object may be an interactive or movable object within the game environment, such as a door, crate, or power-up.

In some embodiments, the machine vision and/or ML model can identify objects in the game environment without explicit training to identify the object. For example, a machine vision system that includes ML may learn to identify tree objects within the game environment, even if the particular model of tree object has not been explicitly taught to the machine vision system. In at least one example, systems and methods according to the present disclosure may be portable between video information from a variety of game applications where different models for common objects, such as tree object, are used. By training the ML model, the machine vision may be able to recognize and detect tree object in the video information. In some examples, elements of the game environment are procedurally generated. A series of procedurally generated tree objects may include common elements but be distinct models from one another, as rendered in the video information. Therefore, an explicitly provided model would be inapplicable to procedurally generated tree objects.

In some embodiments, the machine vision system invokes an application module that is associated with the game application that is the source of the video information. Art styles can vary considerably between game applications. Even a ML model that has been trained on video information from a plurality of game applications to detect tree objects may fail when presented with a new art style. For example, while a first game application and a second game application are competitive first-person shooter games, the appearance of objects may be very different between the games. Specifically, tree objects and other elements of the game environment appear very different between the two game applications.

Systems and methods according to the present disclosure may access an application module that is associated with the game application that is the source of the video information. The application module may be generated by the ML model based on the game engine, may include predetermined or user-defined events, or combinations of both.

As described herein, the ML model data may be stored remotely to the client device and/or the server computer and be accessed by the server computer as needed based on the video information or other information provided by the client device. In at least one embodiment, the ML model data is part of an application module including game application-specific information for machine vision and/or event identification and classification.

The object detection may include any of the methods or techniques described herein to identify the virtual objects in the video information. In some embodiments, the method includes determining the presence of a key event, a popular event, a rare event, or any other type of event based on the present of the object, texture, model, or animation. In some embodiments, determining the presence of an event includes evaluating a change in the virtual object, texture, model, or animation between frames of the plurality of frames. In some embodiments, compared frames are adjacent frames in the native framerate of the rendered game environment. For example, the video information may include 60 frames per second as the client device renders the game environment at 60 frames per second. The compared frames may be adjacent frames in the native 60 frames per second with a delta of approximately 16.67 milliseconds between frames. In some embodiments, the compared frames are key frames or other non-adjacent frames in the native framerate. For example, the video information may include 60 frames per second as the client device renders the game environment at 60 frames per second, but the compared frames are selected 0.25 seconds apart from one another or approximately 15 frames apart.

The changes to the virtual object between the first frame and the second frame may be calculated based on changes relative to the game environment, or changes based on expected correlations. Some changes in the virtual object relative to the game environment may include the appearance or disappearance of the virtual object in the game environment. The comparison of frames may include the detection of a particular animation of an avatar model or other model. A comparison of frames may include the detection of change in textures skinning a model, which may be associated with an event such as receiving damage or acquiring a new piece of equipment in the game.

In some embodiments, the determining the presence of at least one event in the video information includes comparing the detected object, texture, model, or animation to one or more events of an application module. As described herein, the application module may be predetermined or may be generated by a ML system. In some embodiments, the application module includes key events, popular events, rare events, any other types of events, or combinations thereof.

In at least one embodiment, key events are events that progress a gameplay session toward a resolution or definitive outcome. In some embodiments, key events may be predetermined in the application module specifically for the game application being played. Key events for an American football game application may include a touchdown, field goal, fumble, fumble recovery, sack, interception, punt, kickoff, halftime, or full time. Key events for a first-person shooter (FPS) game application may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application may include an opponent elimination, a player elimination, a health pickup, a shield pickup, an ability usage, a cooldown expiration, a multi-elimination, a round victory, a teammate elimination, PvE elimination (such as a minion elimination, a tower destruction, or an elimination); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interest to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, which are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience, which may result in greater social media value.

In some embodiments, the application module includes probability tables that allow the detection of rare events in the video information. For example, drop tables for a role-playing game may control the probability that a game engine provides a particular item to the player avatar in the game environment. If an item has a drop rate of 5.0%, a single detection of the item in the video information is, while uncommon by design, non-anomalous. However, if the method or system described herein detects the item dropping 5 out of 20 chances (a 0.000000147% chance), the sequence may indicate a rare event of interest. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate rare event of interest. The application module may include threshold values to determine when a series of probable events becomes sufficiently rare to be designated a rare event. In some embodiments, a probability curve may be calculated based on the drop table or other probability table, and a threshold may be set at a standard deviation away from a most likely outcome. In another embodiment, the threshold may be set manually, such that a detected rare event or sequence of events is reported when the occurrence exceeds the manually set threshold. In some embodiments, the social media value is at least partially related to the rarity of the rare event. For example, the social media value may be greater for a rarer event, as a rare event is more likely to generate engagement on social media.

While some embodiments of systems and methods for initiating and/or editing group captures evaluate only video information, some embodiments evaluate other forms of information or data to supplement the video information. In some embodiments, the comparison video obtained further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

In some embodiments, a plurality of identified events within a preset temporal proximity to one another may be recorded or reported to the user as an event amplitude. For example, a particular point in the video information or a portion of the video information with a high density of events may indicate a particularly climatic moment or sequence in the video information. The high density of events may be of particular interest to a viewer.

Event detection and/or categorization can allow the video tracks and/or software audio tracks of a group capture to provide multiple POVs on a single event of interest. For example, when an event is detected in both the first video track and second video track of a group capture, the event can be presented from multiple POVs and/or replayed from multiple POVs in an edited video. In some embodiments, when an event is detected from both the first user's POV and the second user's POV, that indicates the event is of unique interest to both users and the chat audio is more likely to be related to the event both users are witnessing at that time in the group capture.

In some embodiments, correlating events between the POVs may include detecting an event in a first video track and not detecting the event in the second video track. For example, a particular event may be visible in the first video track and not in the second video track and/or the particular event may be detected in the first video track and, while present in the second video track, unable to be detected due to the perspective, obstructions, or visual effects.

In some embodiments, a method of automated editing and display of a group capture includes obtaining a group capture. In some embodiments, obtaining a group capture includes transmitting a group capture request and receiving individual captures, such as described herein. In some embodiments, obtaining a group capture includes downloading a group capture from a server or a client device. In some embodiments, obtaining a group capture includes accessing the group capture on a server or other remote storage device. The group capture, as described herein, may be a single group capture file or a plurality of associated files.

The method includes detecting a first event in a first video track of the group capture and detecting a second event in a second video track of the group capture. In some embodiments, the method includes detecting the first event and the second event in the group capture according to event detection methods described herein. For example, detecting the first event and the second event in the group capture may include obtaining an application module and/or ML model data related to the interactive software application of the group capture. In some embodiments, the event is a key event or other type of event that the developer of the game has previously identified. The developer can, therefore, ensure that the identified event is recognized by the application module and/or ML model such that an edit of the group capture displays the event. In doing so, the developer can exercise more control over the presentation of captures of the interactive software application, such as providing a more cinematic display of events in a group capture during play of a game application.

The method includes determining the presence of the first event in the second video track and determining the presence of the second event in the first video track. In some embodiments, the first event and/or the second event is present in both the first video track and the second video track. In some embodiments, the first event is present in the first video track only. In some embodiments, the second event is present in the second video track only. When the first event is detected in the first video, additional information of the group capture may be used to attempt to determine the presence of the first event in the second video track.

For example, software audio information of the second software audio track may be evaluated for audio information associated with the first event. For example, the first event may be an elimination of an enemy character and, while the elimination is not visible in the second video track, audio cues associated with the elimination of the enemy character may be audible in the second software audio track corresponding to the second video track. In other examples, the first event may not be detected in the second video track due to obstructions, such as other virtual objects, animations, visual effects, particle effects, etc., that inhibit the object recognition and/or edge detection used to identify the first event. In such an example, game state data may be used to determine the presence of the first event in the FOV of the second video track. For example, the game state data may include the location and orientation of an enemy at the time of the enemy elimination in the first event. While the second video track may lack sufficient video information to identify the first event independently, the game state data in conjunction with the first video track may allow the system to determine the presence of the first event in the second video track.

In some embodiments, the method optionally includes correlating the presence of the first event and second event in each video track of the group capture. For example, correlating events across video and audio tracks in the group capture can allow the video and audio from different client devices (and from multiple different perspectives and users) to be more precisely synchronized, which may improve and simplify the editing and display of the group capture.

The method further includes displaying the first video track during playback of the first event in the group capture and changing the displayed video track to display the second video track during playback of the second event in the group capture. The automated display of the group capture will select the video and/or audio tracks of the group capture that display the detected events and change between the video and/or audio tracks to do so. The method further includes playing chat audio during the first event and the second event. The audio chat, in addition to the video tracks and software audio tracks, provides a group context to the group capture, allowing users to experience the social component of the event(s) captured.

In some embodiments, the group capture includes a first video track, a second video track, a first chat audio track, a second chat audio track, a first software audio track, and a second software audio track.

For example, there are three detected events in the timeline: a first event detected in the first video track, a second event detected in the second video track, and a third event detected in the third video track. The timeline for display of the group capture displays the first video track during the first event and plays the first software audio track during the same portion of the timeline until the first transition.

After the first transition, the timeline displays the second video track that includes the detected second event and plays the second software audio track associated with the second video track. Between the second event and the third event, the timeline has a second transition at which the timeline switches to display the first video track and first software audio track including the detected third event. As the video and software audio transition between the individual captures from the different client devices, both the first chat audio track and the second chat audio track are played to provide both sides of the conversation that occurred during the detected events. For example, while the first user and the second user were performing different tasks (as different events were detected independently in the video tracks), the users may have been discussing the events while experiencing the events during the group capture.

In other examples, the group capture can allow the chat audio tracks to be played separately to allow the chat audio of each user to be heard during the display of the video track associated with that user and client device. In such an example, both the first user and the second user may have observed the same detected event from different POVs (i.e., from each user's respective location and FOV in the virtual environment) and each user's chat audio may reflect his or her narration or commentary on their perspective of the event.

In some embodiments, the group capture includes a first video track, a second video track, a first chat audio track, a second chat audio track, a first software audio track, and a second software audio track. The timeline begins by displaying the first video track, the first chat audio track and the second chat audio track, and the first software audio associated with the first video track. The timeline illustrates a single detected event that is displayed first upon viewing the group capture by displaying the first user's POV and then displaying the event again from the second user's POV. For example, the timeline displays the first video track, the first chat audio track, and the first software audio track for the first iteration of the event until the first transition, and the timeline displays the second video track, the second chat audio track, and the second software audio track for the second iteration of the event until the second transition. The timeline, in some embodiments, selectively plays only the chat audio track associated with the simultaneously displayed video track during the event(s). After the event is displayed, both chat audio tracks are played to provide both sides of the conversation.

In some embodiments, the replaying of the event from multiple perspectives with the individual reactions and commentary from each chat audio track can allow a cinematic display of the event from multiple angles and users. Such an automated editing method may be beneficial for narrative-driven experiences, such as in game applications. In some embodiments, a developer can communicate with a server via an application programing interface (API) to provide a particular type of display or editing for group captures that include a particular event in the game application. In a specific example, a game may include a dungeon that requires each member of a four-person party to stand on different platforms at the same time to open the dungeon gate. In such an example, the gate opening may be identified by the developer as a key event in the capture, and the developer can, via the API instruct a server or client device displaying the group capture to display that key event (the gate opening) from the perspective of each user sequentially to cinematically display the event and provide each user's individual reactions to the event via the chat audio tracks.

In at least one embodiment, a group capture according to the present disclosure allows for one user to initiate individual video and audio captures from a plurality of client devices and then access the associated individual captures in a single group capture. In some embodiments, the group capture can be automatically edited to provide an engaging and cinematic presentation of the events the users experienced in the group capture.

The present disclosure relates to systems and methods for assisting a user in capturing and editing video information according to at least the examples provided in the sections below:

[A1] In some embodiments, a method of capturing video and audio information includes, at a server computer, determining a capture group that includes at least a first client device and a second client device. The method further includes receiving a group capture request and transmitting an individual capture request to at least the second client device. The method further includes receiving a first individual capture from the first client device and a second individual capture from the second client device, associating the first individual capture with the second individual capture in a group capture, and providing access to the group capture to at least one of the first client device and the second client device.

[A2] In some embodiments, the group capture request of [A1] is received from a client device in the capture group.

[A3] In some embodiments, the method of [A1] or [A2] further includes transmitting an individual capture request to the first client device.

[A4] In some embodiments, the method of any of [A1] through [A3] further includes obtaining a chat audio track.

[A5] In some embodiments, at least one of the first individual capture and the second individual capture of any of [A1] through [A4] includes a chat audio track.

[A6] In some embodiments, determining the capture group of any of [A1] through [A5] includes checking permissions of a user account of the second client device.

[A7] In some embodiments, determining the capture group of any of [A1] through [A6] includes determining a confirmed platform friend status of a first user account of the first client device and a second user account of the second client device.

[A8] In some embodiments, determining the capture group of any of [A1] through [A7] includes determining an in-application party status of a first user account of the first client device and a second user account of the second client device.

[A9] In some embodiments, the individual capture request of any of [A1] through [A8] includes a timestamp based at least partially on the group capture request.

[A10] In some embodiments, associating the first individual capture with the second individual capture in a group capture of any of [A1] through [A9] includes creating a group capture file.

[A11] In some embodiments, associating the first individual capture with the second individual capture in a group capture of any of [A1] through [A10] includes altering metadata of at least one of the first individual capture and the second individual capture.

[A12] In some embodiments, providing access to the group capture of any of [A1] through [A11] includes providing access to at least one of a first user account of the first client device and a second user account of the second client device.

[A13] In some embodiments, providing access to the group capture of any of [A1] through [A12] includes pushing the group capture to at least one of the first client device and the second client device.

[A14] In some embodiments, the group capture of any of [A1] through [A13] includes game state data.

[A15] In some embodiments, the method of any of [A1] through [A14] includes transmitting a delete request to at least one of the first client device and the second client device to delete an individual capture stored on the first client device or the second client device.

[B1] In some embodiments, a system for capturing video and audio information includes a server in data communication with a network. The server includes a processor and a hardware storage device, where the hardware storage device has instructions stored thereon that, when executed by the processor, cause the server to perform any method of [A1] through [A15].

[C1] In some embodiments, a system for capturing video and audio information includes a first client device running an interactive software application, a second client device running the interactive software application, and a server in data communication with the first client device and the second client device via a network. The server includes a processor and a hardware storage device, where the hardware storage device has instructions stored thereon that, when executed by the processor, cause the server to perform any method of [A1] through [A15].

[C2] In some embodiments, the group capture request of [C1] is transmitted to the server from the first client device in response to a user input to the first client device.

[C3] In some embodiments, the group capture request of [C1] is transmitted to the server from the first client device in response to a software request of an interactive software application of the first client device.

[C4] In some embodiments, at least one of the first client device and the second client device of any of [C1] through [C3] is part of a server blade.

In another aspect, some embodiments of the technology described herein include a computer-readable storage medium for storing computer-readable instructions. The computer-readable instructions, when executed by one or more hardware processors, perform any of the methods described herein.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of capturing video and audio information, the method comprising:
    at a server computer:
        determining a capture group, wherein the capture group includes a first client device and a second client device;
        receiving a group capture request;
        transmitting an individual capture request to at least the second client device;
        receiving a first individual capture from the first client device and a second individual capture from the second client device;
        associating the first individual capture with the second individual capture in a group capture; and
        providing access to the group capture to at least one of the first client device and the second client device.

2. The method of claim 1, wherein the group capture request is received from a client device in the capture group.

3. The method of claim 1, further comprising transmitting an individual capture request to the first client device.

4. The method of claim 1, further comprising obtaining a chat audio track.

5. The method of claim 1, wherein at least one of the first individual capture and the second individual capture includes a chat audio track.

6. The method of claim 1, wherein determining the capture group includes checking permissions of a user account of the second client device.

7. The method of claim 1, wherein determining the capture group includes determining a confirmed platform friend status of a first user account of the first client device and a second user account of the second client device.

8. The method of claim 1, wherein determining the capture group includes determining an in-application party status of a first user account of the first client device and a second user account of the second client device.

9. The method of claim 1, wherein the individual capture request includes a timestamp based at least partially on the group capture request.

10. The method of claim 1, wherein associating the first individual capture with the second individual capture in a group capture includes creating a group capture file.

11. The method of claim 1, wherein associating the first individual capture with the second individual capture in a group capture includes altering metadata of at least one of the first individual capture and the second individual capture.

12. The method of claim 1, wherein providing access to the group capture includes providing access to at least one of a first user account of the first client device and a second user account of the second client device.

13. The method of claim 1, wherein providing access to the group capture includes pushing the group capture to at least one of the first client device and the second client device.

14. The method of claim 1, wherein the group capture includes game state data.

15. The method of claim 1, further comprising transmitting a delete request to at least one of the first client device and the second client device to delete an individual capture stored on the first client device or the second client device.

16. A system for capturing video and audio information, the system comprising:
    a server in data communication with a network, wherein the server includes:
        a processor; and
        a hardware storage device having instructions stored thereon that,
        when executed by the processor, cause the server to:
            determine a capture group, wherein the capture group includes a first client device and a second client device in data communication with the network,
            receive a group capture request via the network, transmit an individual capture request to at least the second client device, receive a first individual capture from the first client device and a second individual capture from the second client device, associate the first individual capture with the second individual capture in a group capture, and provide access to the group capture to at least one of the first client device and the second client device.

17. A system for capturing video and audio information, the system comprising:

a first client device running an interactive software application;

a second client device running the interactive software application; and a server in data communication with the first client device and the second client device via a network, wherein the server includes:

a processor; and a hardware storage device having instructions stored thereon that, when executed by the processor, cause the server to:

determine a capture group, wherein the capture group includes the first client device and the second client device in data communication with the network, receive a group capture request via the network, transmit an individual capture request to at least the second client device, receive a first individual capture from the first client device and a second individual capture from the second client device, associate the first individual capture with the second individual capture in a group capture, and provide access to the group capture to at least one of the first client device and the second client device.

18. The system of claim 17, wherein the group capture request is transmitted to the server from the first client device in response to a user input to the first client device.

19. The system of claim 17, wherein the group capture request is transmitted to the server from the first client device in response to a software request of an interactive software application of the first client device.

20. The system of claim 17, wherein at least one of the first client device and the second client device is part of a server blade.

* * * * *